(12) United States Patent
Mizusawa

(10) Patent No.: US 10,292,092 B2
(45) Date of Patent: May 14, 2019

(54) DEVICE AND METHOD THAT USES BASE STATION FREQUENCY BAND AS A SECONDARY COMPONENT CARRIER OF CARRIER AGGREGATION

(71) Applicant: SONY CORPORATION, Tokyo (JP)

(72) Inventor: Nishiki Mizusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 135 days.

(21) Appl. No.: 15/301,813

(22) PCT Filed: Feb. 5, 2015

(86) PCT No.: PCT/JP2015/053204
§ 371 (c)(1),
(2) Date: Oct. 4, 2016

(87) PCT Pub. No.: WO2015/162966
PCT Pub. Date: Oct. 29, 2015

(65) Prior Publication Data
US 2017/0188293 A1 Jun. 29, 2017

(30) Foreign Application Priority Data
Apr. 22, 2014 (JP) ................................. 2014-088084

(51) Int. Cl.
*H04W 48/16* (2009.01)
*H04W 16/14* (2009.01)
(Continued)

(52) U.S. Cl.
CPC ........... *H04W 48/16* (2013.01); *H04W 16/14* (2013.01); *H04W 24/08* (2013.01); *H04W 72/04* (2013.01);
(Continued)

(58) Field of Classification Search
CPC ... H04W 48/16; H04W 24/08; H04W 72/085; H04W 74/0816
See application file for complete search history.

(56) References Cited

U.S. PATENT DOCUMENTS

2013/0279438 A1* 10/2013 Kwon ............... H04W 72/0406
370/329
2014/0153536 A1* 6/2014 Ouchi ................. H04W 52/146
370/329
(Continued)

FOREIGN PATENT DOCUMENTS

| JP | 2010-268380 A | 11/2010 |
|---|---|---|
| JP | 2011-193101 A | 9/2011 |
| WO | 2012/098852 A1 | 7/2012 |

OTHER PUBLICATIONS

International Search Report dated Apr. 14, 2015 in PCT/JP2015/053204 filed Feb. 5, 2015.
(Continued)

*Primary Examiner* — Wei Zhao
(74) *Attorney, Agent, or Firm* — Xsensus LLP

(57) ABSTRACT

Provided is a device that acquires a result of discovery of a wireless local area network (LAN) access point that uses a frequency band, and controls monitoring of a radar wave in the frequency band based on the result of the discovery before use of the frequency band by a base station of a cellular system starts. This makes it possible to expedite the use of a frequency band used in a wireless local area network (LAN) in a cellular system.

19 Claims, 22 Drawing Sheets

(51) Int. Cl.
*H04W 72/04* (2009.01)
*H04W 72/08* (2009.01)
*H04W 84/12* (2009.01)
*H04W 24/08* (2009.01)
*H04W 74/08* (2009.01)
*H04W 88/08* (2009.01)

(52) U.S. Cl.
CPC ....... *H04W 72/0453* (2013.01); *H04W 72/08* (2013.01); *H04W 72/085* (2013.01); *H04W 74/0816* (2013.01); *H04W 84/12* (2013.01); *H04W 88/08* (2013.01)

(56) References Cited

U.S. PATENT DOCUMENTS

2015/0011226 A1\* 1/2015 De Sousa ............. H04W 24/02
455/446
2017/0332314 A1\* 11/2017 Yunoki ................ H04W 76/10

OTHER PUBLICATIONS

"Annex 26 to Working Party 5A Chairman's Report; Working Document Towards a Preliminary Draft New Report ITU-R [LMS.CRS2]; Cognitive radio systems [(CRS) applications] in the land mobile service", Radiocommunication Study Groups, RP-130739, 3GPP TSG RAN Meeting #60, Jun. 11-14, 2013, 30 pages.

\* cited by examiner

FIG. 4

| ELEMENT ID | LENGTH | QUIET COUNT | QUIET PERIOD | QUIET DURATION | QUIET OFFSET |

FIG. 13
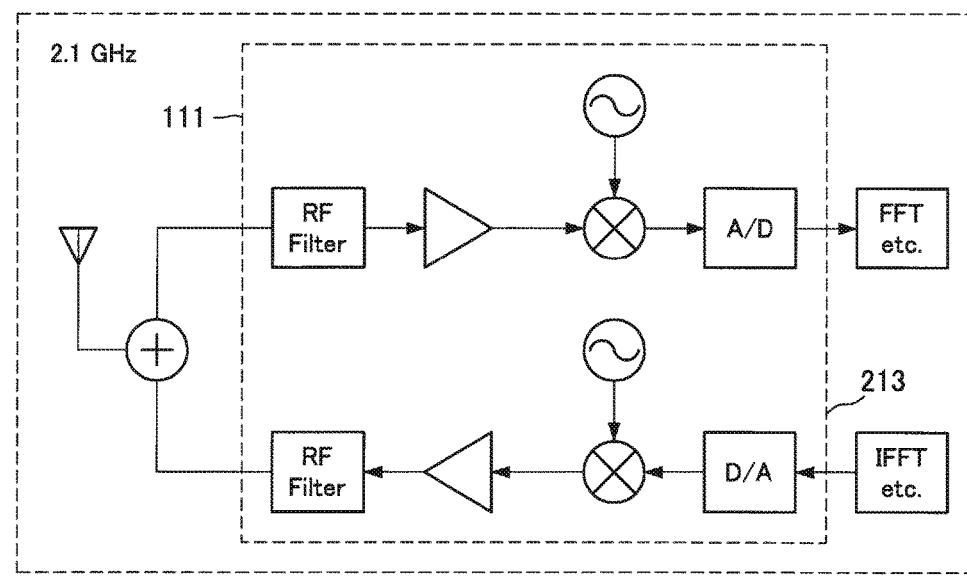
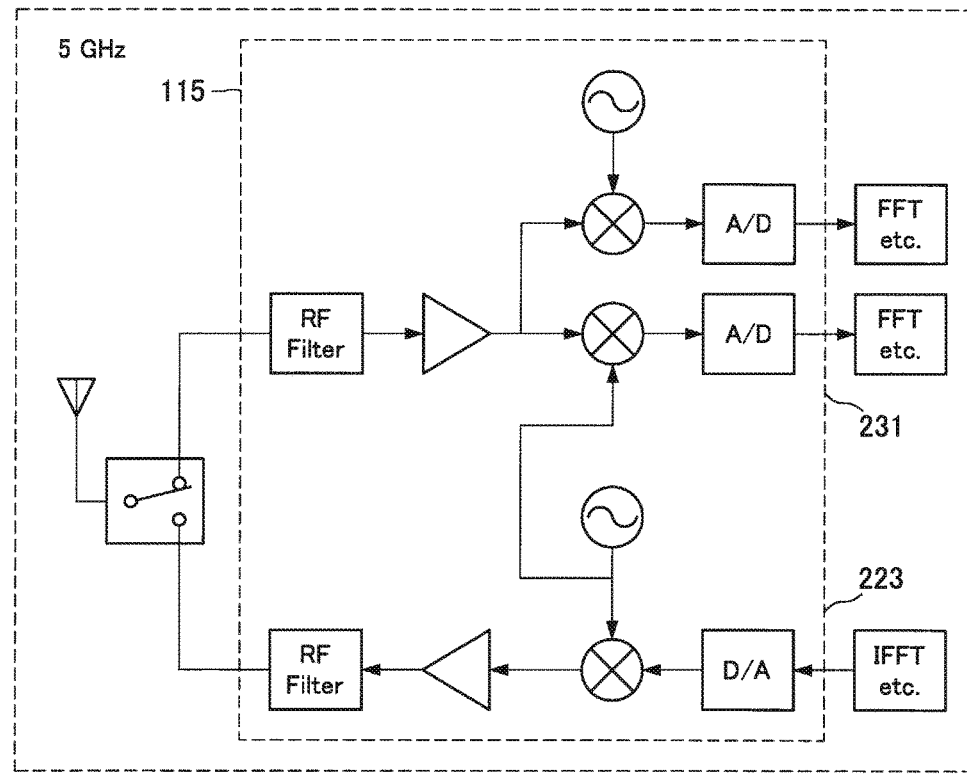

DEVICE AND METHOD THAT USES BASE STATION FREQUENCY BAND AS A SECONDARY COMPONENT CARRIER OF CARRIER AGGREGATION

TECHNICAL FIELD

The present technology relates to a device and a method.

BACKGROUND ART

In cellular systems, there is a problem of radio frequency depletion due to traffic surges. Therefore, the possibility of using an unlicensed frequency band of a 5 GHz band in cellular systems is being investigated.

A frequency band in the 5 GHz band is used in wireless local area networks (LANs). In addition, some frequency bands of the 5 GHz band are used for various types of radar and satellite communication. Therefore, in a wireless LAN access point that uses such a frequency band, it is necessary to avoid interference with various types of radar and satellite communication. Specifically, for example, an operation of dynamic frequency selection (DFS) is requested from a wireless LAN access point. The operation of DFS includes monitoring radar waves for, for example, 60 seconds.

For example, Patent Literature 1 discloses a technique in which, when one of least two wireless LA N access points that operate in a wireless distribution system (WDS) mode detects radar waves in a frequency band, the other is notified of a candidate of another frequency band, and monitoring of radar waves in the other frequency band is performed, and when radar waves are not detected, a beacon is transmitted using the other frequency band.

CITATION LIST

Patent Literature

Patent Literature 1 JP2010-268380A

SUMMARY OF INVENTION

Technical Problem

Even when a frequency band of a 5 GHz band is used in a cellular system, for example, if a base station of the cellular system performs an operation of DFS, it is possible to suppress interference with radar waves by the cellular system. However, since monitoring of radar waves takes a long time, start of the frequency band in the cellular system may be delayed.

Therefore, it is preferable to provide a mechanism in which it is possible to start use of a frequency band used in a wireless LAN in a cellular system more quickly.

Solution to Problem

According to the present disclosure, there is provided a device including: an acquisition unit configured to acquire a result of discovery of a wireless LAN access point that uses a frequency band; and a control unit configured to control monitoring of a radar wave in the frequency band based on the result of the discovery before use of the frequency band by a base station of a cellular system starts.

According to the present disclosure, there is provided a method including: acquiring a result of discovery of a wireless LAN access point that uses a frequency band; and controlling, by a processor, monitoring of a radar wave in the frequency band based on the result of the discovery before use of the frequency band by a base station of a cellular system starts.

Advantageous Effects of Invention

According to the present disclosure described above, it is possible to start use of a frequency band used in a wireless LAN in a cellular system more quickly. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 4 is a first illustrative diagram for describing specific content of a quiet element.

FIG. 13 is an illustrative diagram for describing a second example of a transmission and reception unit included in a wireless communication unit.

DESCRIPTION OF EMBODIMENT(S)

Hereinafter, preferred embodiments of the present disclosure will be described in detail with reference to the appended drawings. In this specification and the drawings, elements that have substantially the same function and structure are denoted with the same reference signs, and repeated explanation is omitted.

Also, in this specification and the appended drawings, elements having substantially the same function and structure may in some cases be distinguished by different letters appended to the same sign. For example, multiple elements having substantially the same function and structure are distinguished as base stations 100A, 100B and 100C as necessary. On the other hand, when none of the multiple elements having substantially the same function and structure is particularly distinguished, only the same sign will be given. For example, the base stations 100A, 100B and 100C will be simply designated as the base station 100 when not particularly distinguished.

The description will proceed in the following order.
1. Introduction
2. Schematic configuration of a cellular system
3. Configuration of a base station
4. Process flow
5. Application example
6. Summary

1. INTRODUCTION

First, wireless LAN technology will be described with reference to FIG. 1 to FIG. 6.
(DFS)
(a) Frequency Band A frequency band of a 5 GHz band is used in a wireless LAN. In other words, a frequency band of the 5 GHz band is used as a wireless LAN channel. In addition, some frequency bands of the 5 GHz band are used for various types of radar and satellite communication. Therefore, in a wireless LAN access point that uses such a frequency band, it is necessary to avoid interference with various types of radar and satellite communication. Specifically, for example, an operation of dynamic frequency selection (DFS) is requested from a wireless LAN access point. Hereinafter, a specific example of the frequency band will be described with reference to FIG. 1.

Figure 1:
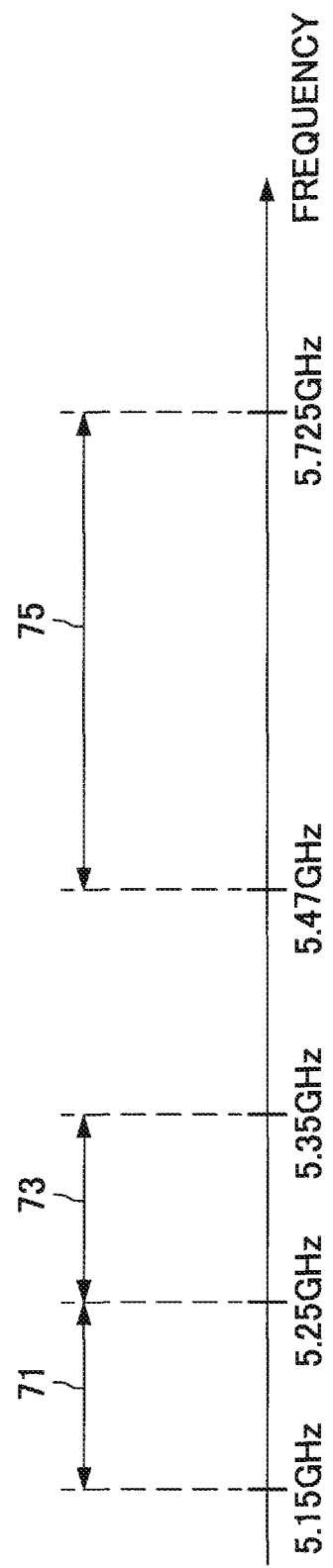
FIG. 1 is an illustrative diagram for describing an example of a frequency band for which an operation of DFS is requested.

FIG. 1 is an illustrative diagram for describing an example of a frequency band for which an operation of DFS is requested. As illustrated in FIG, a frequency band 71 of 5.15 GHz to 5.25 GHz, a frequency band 73 of 5.25 GHz to 5.35 GHz and a frequency band 75 of 5.47 GHz to 5.725 GHz are shown. For example, the frequency band 73 and the frequency band 75 are used for various types of radar and satellite communication. Therefore, an operation of DFS is requested from a wireless LAN access point that uses the frequency band 73 and the frequency band 75. The frequency band 71 and the frequency band 73 are available only indoors. The frequency band 75 is available indoors and outdoors.

(b) Operation of DFS

As an operation of DFS, the wireless LAN access point performs monitoring of radar waves in a frequency band and discontinuation of use of a frequency band. Hereinafter, a specific example of an operation of DFS will be described with reference to FIG. 2.

Figure 2:
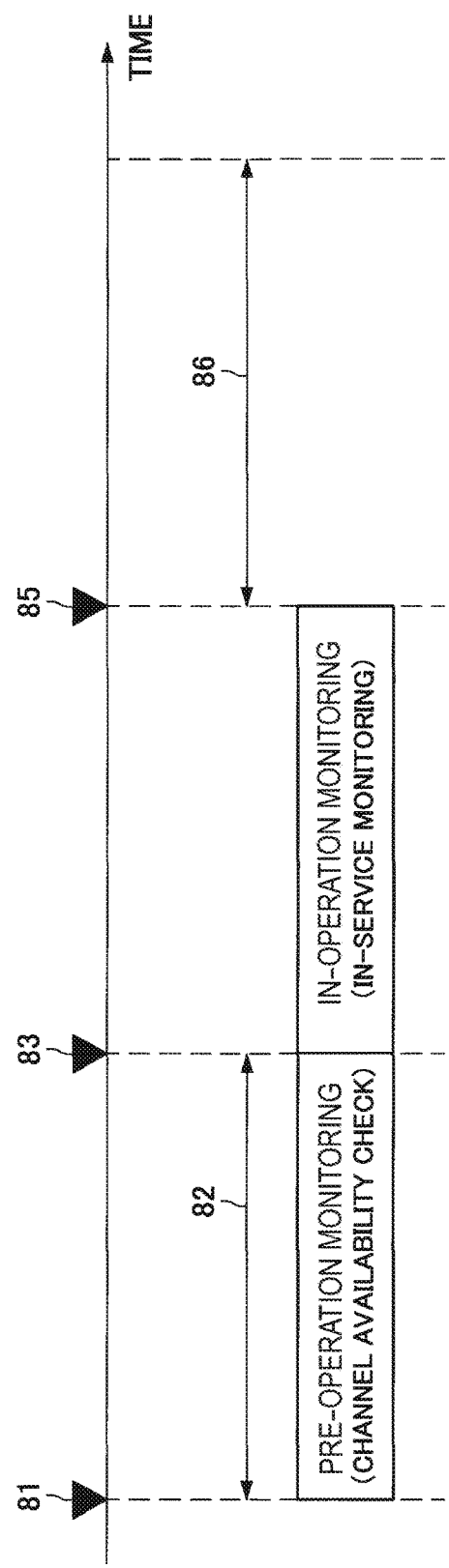
FIG. 2 is an illustrative diagram for describing a specific example of an operation of DFS.

FIG. 2 is an illustrative diagram for describing a specific example of an operation of DFS. As illustrated in FIG. 2, first, at a time point 81, a power source of a wireless LAN access point is turned on. Then, before use of a wireless LAN channel starts, the wireless LAN access point performs monitoring of radar waves in the channel for a predetermined period 82. The monitoring is referred to as pre-operation monitoring or channel availability check. In addition, the predetermined period 82 is, for example, 60 seconds. When no radar waves are detected in the channel for the predetermined period 82, the wireless LAN access point starts use of the channel at a time point 83 after the predetermined period 82. Further, the wireless LAN access point performs monitoring of radar waves in the channel even after use of the channel starts. The monitoring is referred to as in-operation monitoring or in-service monitoring. When radar waves are detected at a time point 85 during the monitoring, the wireless LAN access point stops use of the channel within a predetermined period 86. For example, the predetermined period 86 is 10 seconds. Then, the wireless LAN access point is unable to use the frequency band for a long period (for example, a period of 30 minutes or longer). In addition, the wireless LAN access point selects another channel and attempts to resume communication after the time point 85.

(Beacon Frame)

In order for a wireless LAN station to discover a network, the wireless LAN access point transmits a beacon frame including parameters necessary for subscription to a network at certain time intervals. Hereinafter, specific content of information included in a beacon frame will be described with reference to FIG. 3.

Figure 3:
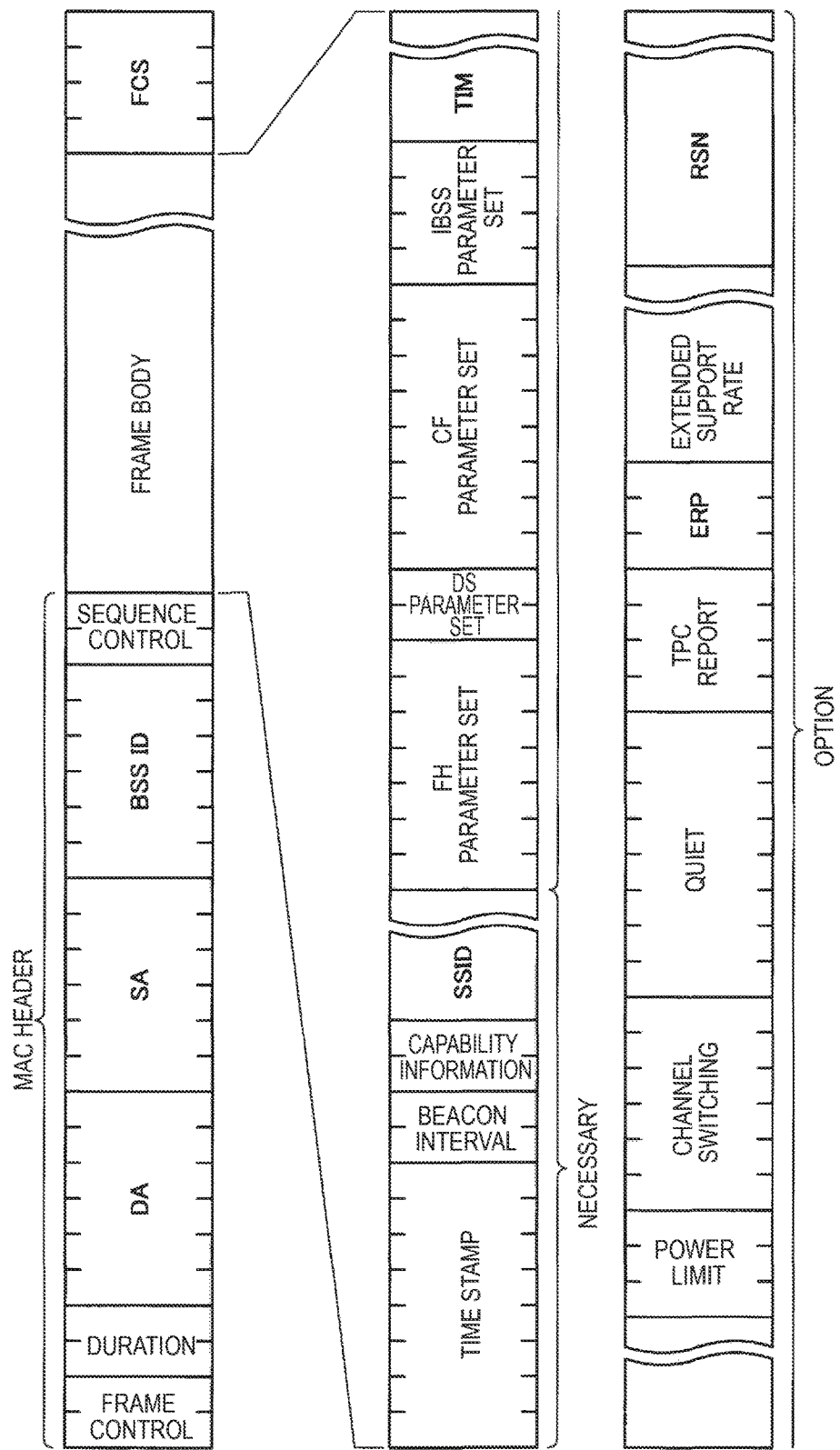
FIG. 3 is an illustrative diagram for describing information included in a beacon frame.

FIG. 3 is an illustrative diagram for describing information included in a beacon frame. As illustrated in FIG. 3, the beacon frame includes a media access control (MAC) header, a frame body and a frame check sequence (FCS). In addition, the frame body includes necessary information and may include optional information.

For example, a beacon interval is included as the necessary information. The beacon interval is 16-bit information that indicates a transmission cycle of a beacon frame in units of time units (TUs). In general, a transmission cycle of a beacon is set to 100 TU (about 100 milliseconds).

In addition, for example, a TPC report is included as the optional information. The TPC report includes transmission power (dBm) of a frame and a link margin (dB) provided for safety of a station. The wireless LAN station may know a propagation loss from measured reception power and the transmission power, and can set optimal transmission power based on the propagation loss and the link margin.

In addition, for example, a quiet element is included as the optional information.

(Quiet Element)

The quiet element is information that designates a time zone for which use of a channel is disabled for all stations in order to know whether there is interference with radar. Hereinafter, specific content of the quiet element will be described with reference to FIG. 4 and FIG. 5.

FIG. 4 is a first illustrative diagram for describing specific content of the quiet element. As illustrated in FIG. 4, the quiet element includes a quiet count, a quiet period, a quiet duration and a quiet offset. The quiet count indicates the number of times a beacon frame is transmitted until the quiet period starts. The quiet period indicates the number of beacon intervals included in the quiet period. The quiet duration indicates a period for which quiet (that is, a state in which no stations use a channel) continues in units of TU units. The quiet offset indicates a time from an end of a beacon frame until the quiet in units of TU units.

Figure 5:
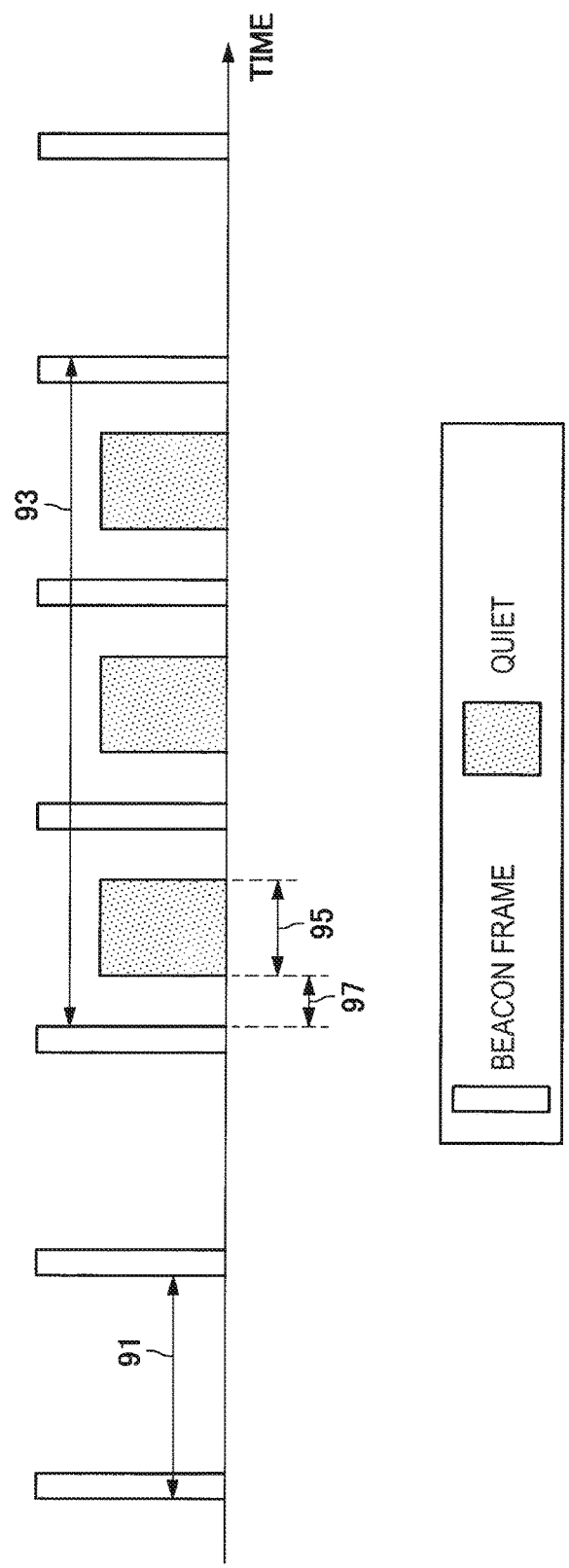
FIG. 5 is a second illustrative diagram for describing specific content of a quiet element.

FIG. 5 is a second illustrative diagram for describing specific content of the quiet element. As illustrated in FIG. 5, a beacon frame is transmitted at a beacon interval 91. In addition, after the beacon frame is transmitted only the number of times that is indicated by the quiet count, a period 93 corresponding to the quiet period (a three-beacon interval) starts. In the period 93, all stations refrain from using a channel during a period 95 corresponding to the quiet duration only after a period 97 corresponding to the quiet offset from an end of each beacon. When the beacon frame is detected, the wireless LAN station acquires the beacon interval and the quiet element and does not use a channel during the period 95. On the other hand, the wireless LAN access point performs monitoring of radar waves during the period 95. Accordingly, the wireless LAN access point can perform monitoring of radar waves without interference from a station.

(Discovery of a Network)

A method of the wireless LAN station discovering a wireless LAN (a wireless LAN access point) includes a passive scan and an active scan. The passive scan is a method in which reception of a beacon frame transmitted by the wireless LAN access point is awaited. On the other hand, the active scan is a method in which a probe request frame is transmitted and reception of a probe response frame transmitted by the wireless LAN access point is awaited.

The probe request frame includes a service set identifier (SSID) for identifying a network (that is, a wireless LAN) and the wireless LAN access point corresponding to the SSID transmits the probe response frame. The probe response frame includes all information included in the beacon frame. In order to discover any network (any wireless LAN access point), the station may transmit a probe request frame including a broadcast SSID rather than a specific SSID.

(Access Method of a Wireless LAN)

There are two access methods of IEEE 802.11, a distributed coordination function (DCF) method and a point coordination function (PCF) method. DCF is a method in which access rights compete with each other within a basic service set (BSS) according to a predetermined rule. On the other hand, PCF is a method in which access rights are controlled within a BSS in a concentrated manner. In general, DCF is widely used as an access method of a wireless LAN.

In DCF, carrier sense multiple access/collision avoidance (CSMA/CA) is used. In CSMA/CA, carrier sense is performed in order to ascertain whether a wireless LAN channel is busy. The carrier sense includes physical carrier sense and virtual carrier sense. The physical carrier sense is a method of checking in a physical layer whether a channel is busy. The virtual carrier sense is a method of checking by a network allocation vector (NAV) whether a channel is busy. Hereinafter, a mechanism of CSMA/CA will be described with reference to FIG. 6.

Figure 6:
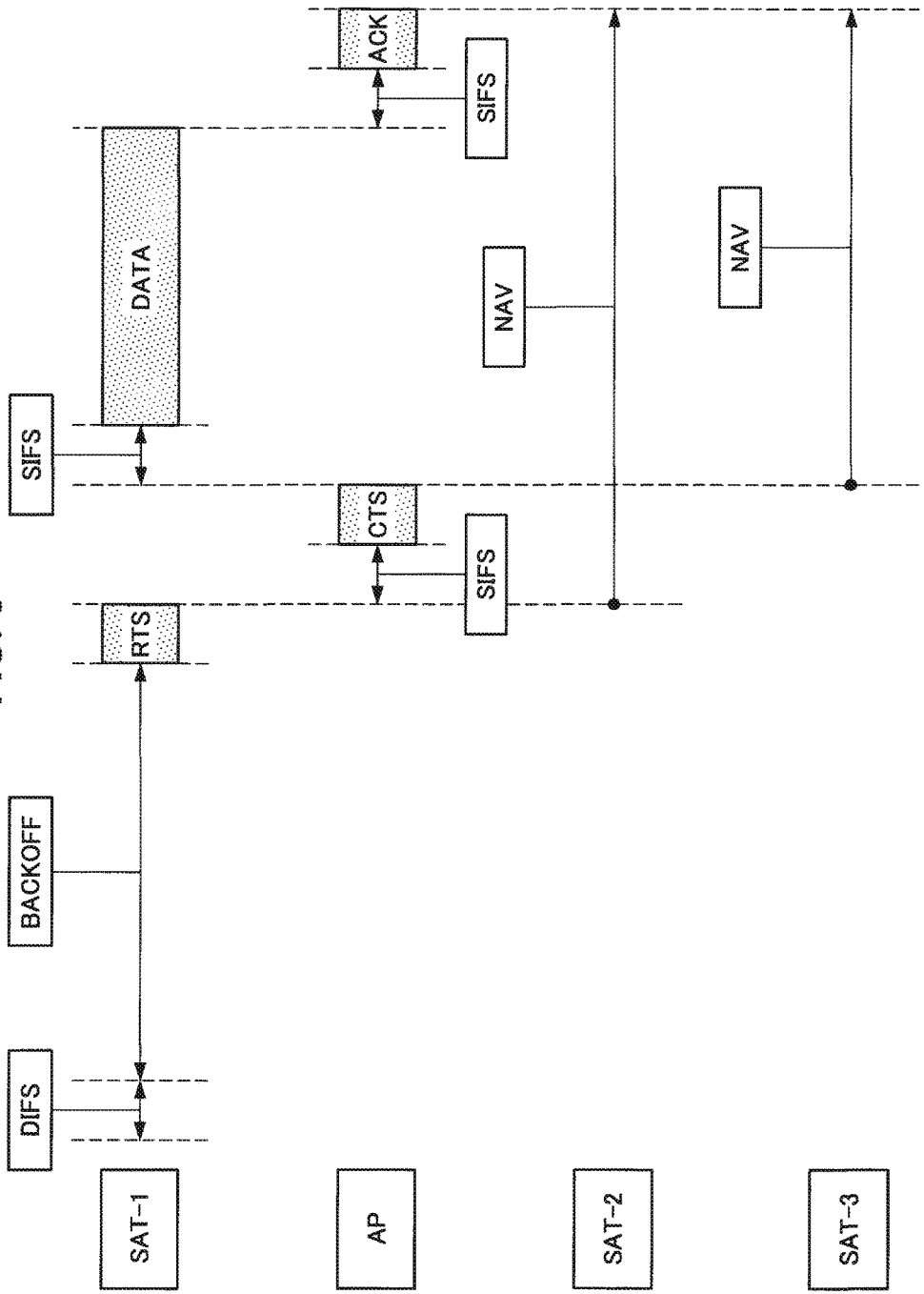
FIG. 6 is an illustrative diagram for describing the mechanism of CSMA/CA.

FIG. 6 is an illustrative diagram for describing the mechanism of CSMA/CA. Referring to FIG. 6, wireless LAN stations 1 to 3 (STA-1 to 3) and a wireless LAN access point (AP) are shown. In this example, the STA1 transmits data to the AP. The STA-2 is positioned within the communication range of the STA-1. The STA-3 is not positioned within the communication range of the STA-1, but is positioned within the communication range of the AP. The STA-1 ascertains that a signal has not been transmitted for a duration called DCF Inter Frame Spacing (DIFS) after the end of a busy period. Thereafter, the STA-1 further stands by for a backoff time that is randomly set for each terminal device, and if a signal is not transmitted during the backoff time either, it transmits a Request To Send (RTS) frame. Then, the AP and the STA-2 receive the RTS frame. The STA-2 acquires a value to be included in a duration field of the RTS frame according to the reception of the RTS frame, and sets the value as a network allocation vector (NAV). Then, the STA-2 holds the signal through a period until transmission of an ACK frame by the AP ends. According to the reception of the RTS frame, the AP transmits a Clear To Send (CTS) frame a Short InterFrame Space (SIFS) after the end of the RTS frame. Then, the STA-1 and STA-3 receive the CTS frame. The STA-3 acquires a value to be included in a duration field of the CTS frame according to the reception of the CTS frame, and sets the value as an NAV. Then, the STA-2 holds a signal through the period until transmission of an ACK frame by the AP ends. The STA-1 transmits a data frame to the AP an SIFS after the end of the CTS frame according to the reception of the CTS frame. Then, the AP transmits the ACK frame to the STA-1 the SIFS after the end of the data frame. In this manner, while the STA-1 transmits data to the AP, the STA-2 and STA-3 hold transmission of a signal, and thus collisions can be avoided.

2. SCHEMATIC CONFIGURATION OF A CELLULAR SYSTEM

Figure 7:
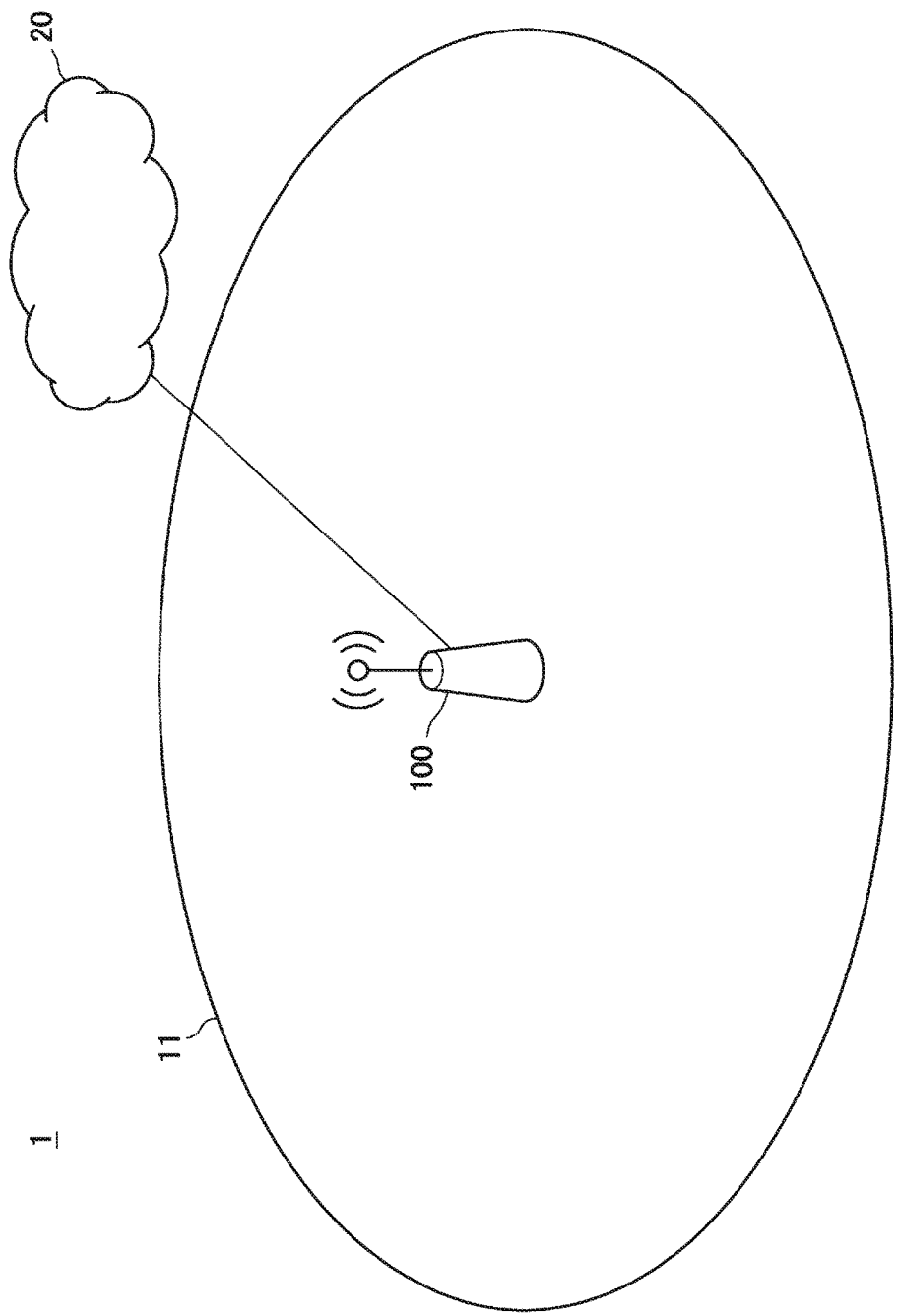
FIG. 7 is an illustrative diagram showing an example of a schematic configuration of a cellular system according to an embodiment of the present disclosure.

Next, referring to FIG. 7 to FIG. 10, FIG. 7 is an illustrative diagram showing an example of a schematic configuration of a cellular system 1 according to the present embodiment. As illustrated in FIG. 7, the cellular system 1 includes the base station 100 and a core network 20. The cellular system 1 complies with, for example, a communication standard of a cellular system, and the communication standard is a communication standard of, for example, Third Generation Partnership Project (3GPP). More specifically, for example, the communication standard is LTE, LTE-Advanced, or a communication standard equivalent thereto.

(Base Station 100)

The base station 100 is a base station of the cellular system 1 and performs wireless communication with a terminal device. For example, the base station 100 performs wireless communication with a terminal device that is positioned within a cell 11, which is a communication area of the base station 100. Specifically, for example, the base station 100 transmits a downlink signal to a terminal device and receives an uplink signal from a terminal device.

(a) Frequency Band to be Used

For example, the base station 100 performs wireless communication using a frequency band for the cellular system 1 (hereinafter referred to as a "cellular band"). The cellular band is, for example, a band that is included in a license band allocated for an operator of the cellular system 1. For example, the base station 100 supports carrier aggregation and uses the cellular band as a component carrier (CC).

In particular, in the present embodiment, the base station 100 further uses a frequency band that is used in a wireless LAN (hereinafter referred to as a "wireless LAN band"). For example, the frequency band is a wireless LAN channel. For example, the base station 100 uses a part or all of the wireless LAN band (for example, the wireless LAN channel) as the component carrier (CC).

The wireless LAN band may be used to transmit radar waves. As an example, a frequency band of 5.25 GHz to 5.35 GHz and a frequency band of 5.47 GHz to 5.725 GHz within the 5 GHz band are used to transmit radar waves. Radar waves are transmitted by a radar station. Hereinafter, a specific example in which the radar station and the base station 100 are arranged will be described with reference to FIG. 8.

Figure 8:
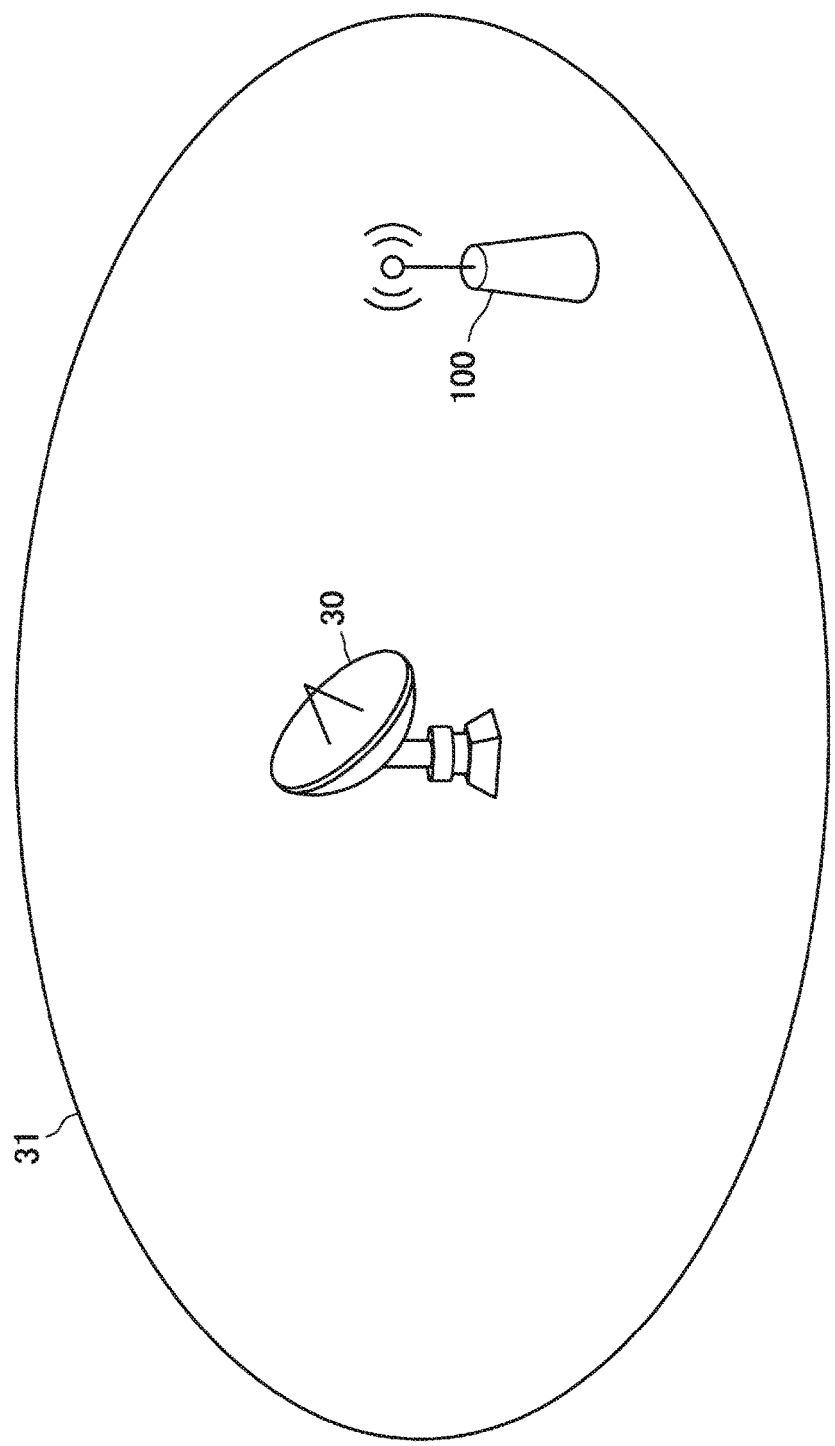
FIG. 8 is an illustrative diagram for describing a specific example in which a radar station and a base station are arranged.

FIG. 8 is an illustrative diagram for describing a specific example in which the radar station and the base station 100 are arranged. As illustrated in FIG. 8, the base station 100 and a radar station 30 are shown. The radar station uses the wireless LAN band and transmits radar waves throughout an area 31. For example, the base station 100 is positioned within the area 31.

(b) Cell 11

For example, the cell 11 is a small cell. That is, the base station 100 is a base station of a small cell (hereinafter referred to as a "small base station"). For example, the cell 11 overlaps a macro cell partially or entirely.

The cell 11 may be a macro cell. That is, the base station 100 may be a base station of the macro cell (hereinafter referred to as a "macro base station").

(c) Arrangement Relation with a Wireless LAN Access Point

The wireless LAN access point may be arranged in the vicinity of the base station 100. Hereinafter, this will be described with reference to a specific example of FIG. 9 and FIG. 10.

Figure 9:
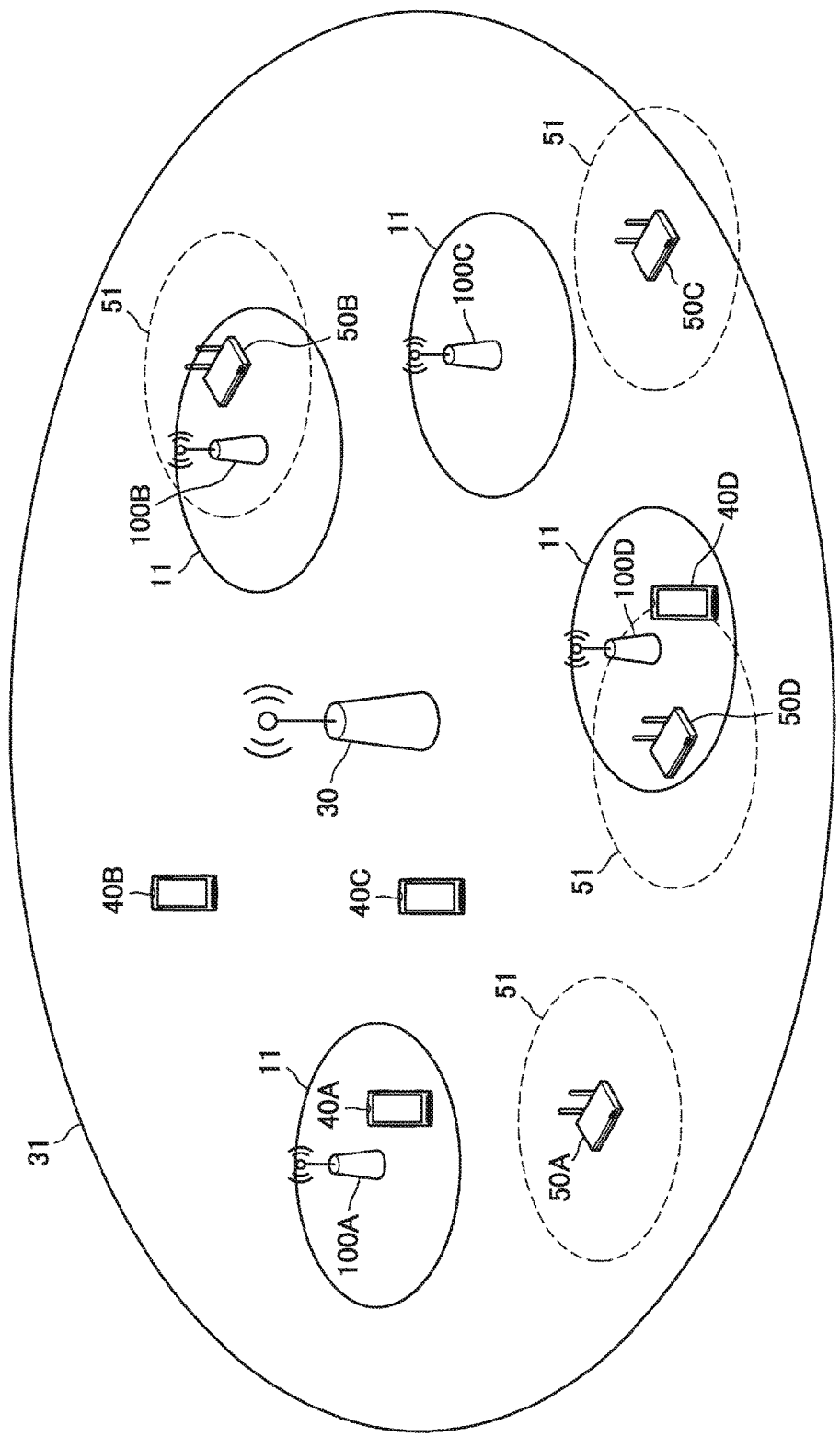
FIG. 9 is an illustrative diagram for describing an example in which a base station and a wireless LAN access point are arranged when the base station according to the same embodiment is a small base station.

FIG. 9 is an illustrative diagram for describing an arrangement example of the base station 100 and the wireless LAN access point when the base station 100 according to the present embodiment is the small base station. As illustrated in FIG. 9, the base stations 100A to 100D serving as small base stations, a macro base station 30 of a macro cell 31, terminal devices 40A to 40D and wireless LAN access points 50A to 50D are shown. For example, the wireless access point SOB is arranged in the vicinity of the base station 100B. The base station 100B is positioned within a communication area 51 of the wireless access point 50B. In addition, for example, the wireless access point 50D is arranged in the vicinity of the base station 100D. The base station 100D is positioned within a communication area 51 of the wireless access point 50D. The wireless access point 50 is not arranged in the vicinity of the base station 100A and the base station 100C.

Figure 10:
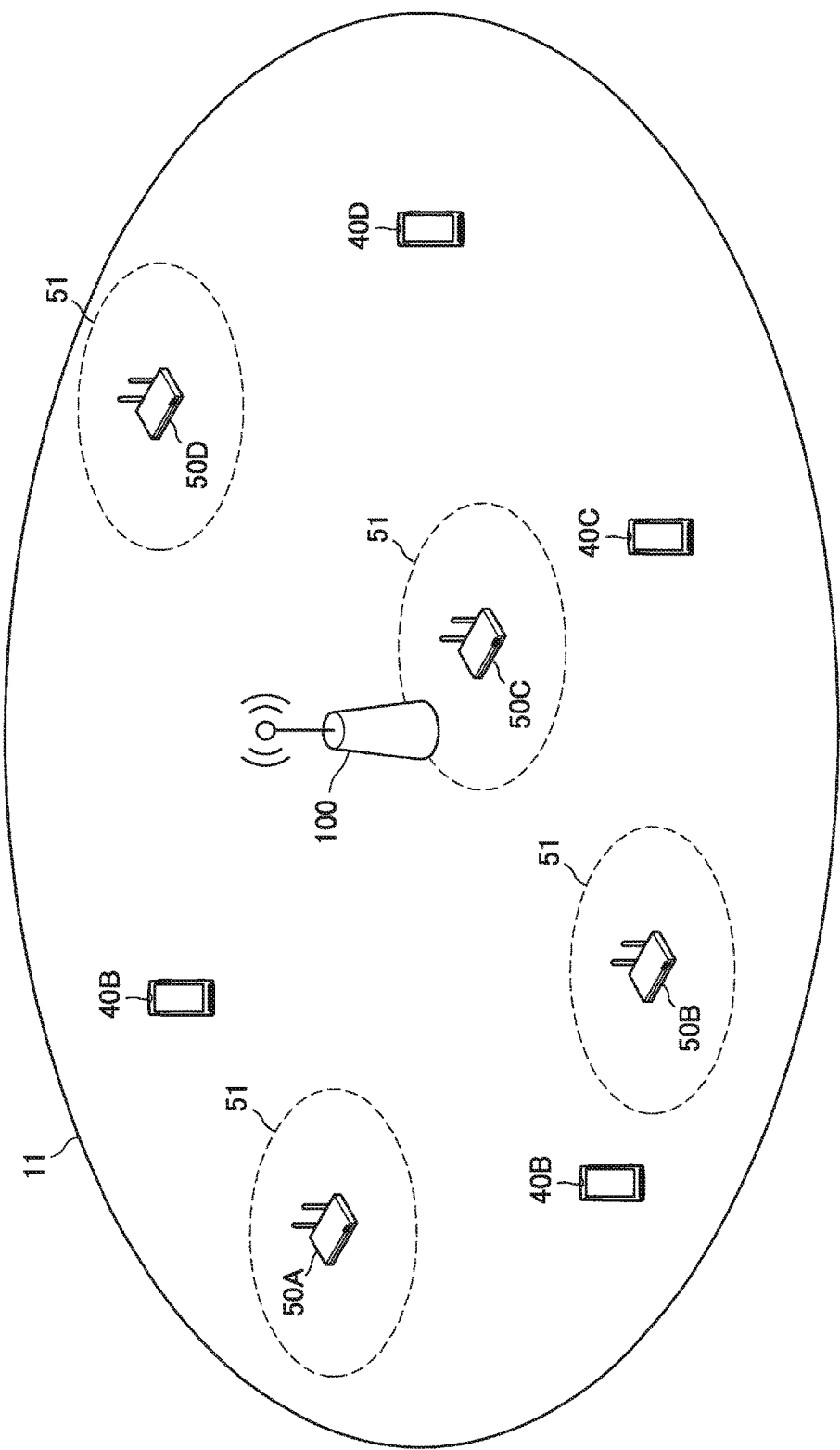
FIG. 10 is an illustrative diagram for describing an example in which a base station and a wireless LAN access point are arranged when the base station according to the same embodiment is a macro base station.

FIG. 10 is an illustrative diagram for describing an arrangement example of the base station 100 and the wireless LAN access point when the base station 100 according to the present embodiment is the macro base station. As illustrated in FIG. 10, the base station 100 serving as a macro base station, the terminal devices 40A to 40D and the wireless LAN access points 50A to 50D are shown. For example, the wireless access point 50C is arranged in the vicinity of the base station 100B, and the base station 100 is positioned within a communication area 51 of the wireless access point 50C.

(Core Network 20)

The core network 20 includes a core network node. The core network includes, for example, a mobility management entity (MME), a serving gateway (S-GW) and a packet data network (PDN) gateway (P-GW).

The schematic configuration of the cellular system 1 according to the present embodiment has been described above. According to the present embodiment, before use of the wireless LAN band by the base station 100 starts, the base station 100 controls monitoring of radar waves in the wireless LAN band based on a result of discovery of the wireless LAN access point that uses the wireless LAN band. Accordingly, for example, it is possible to start use of the wireless LAN band in the cellular system 1 more quickly.

3. CONFIGURATION OF A BASE STATION

Figure 11:
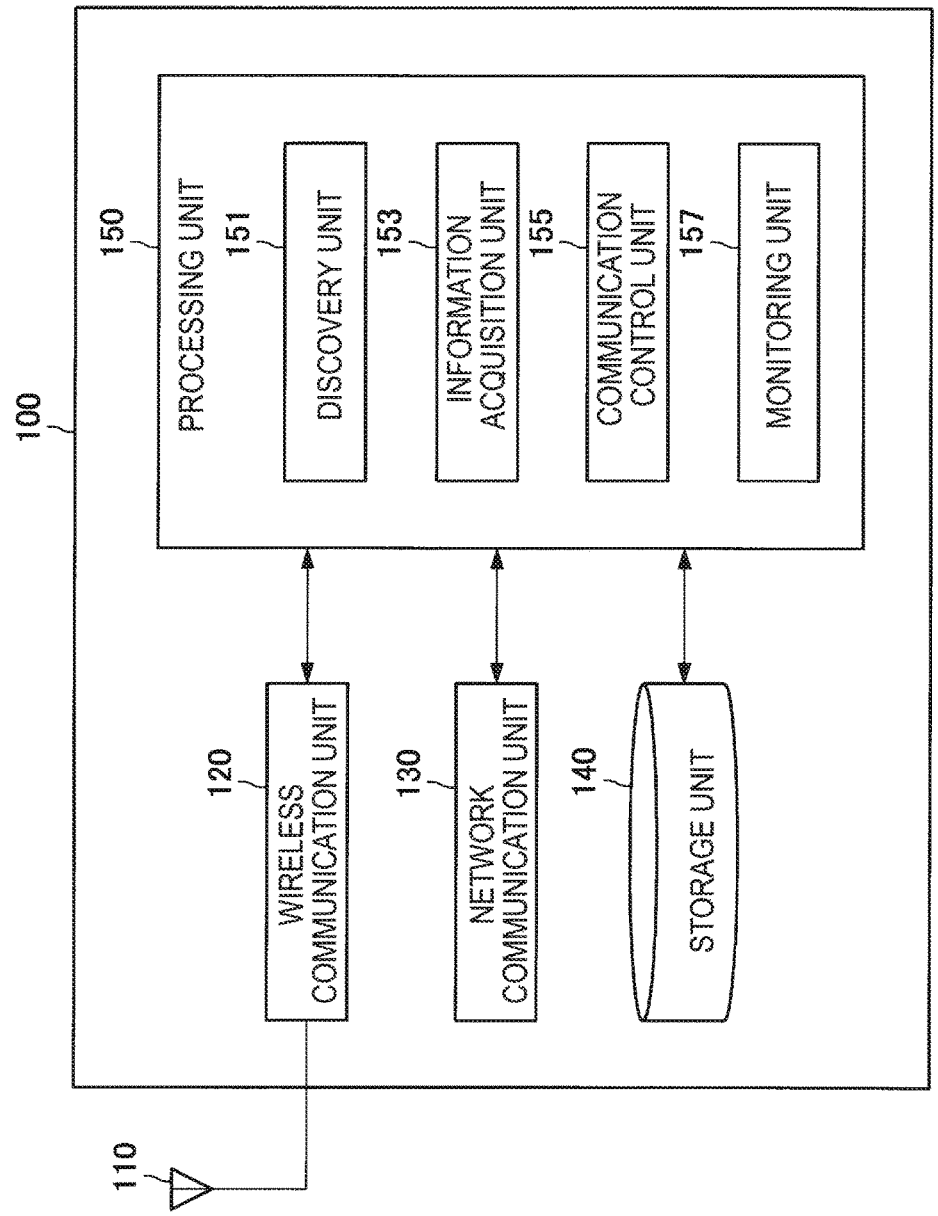
FIG. 11 is a block diagram showing an example of a configuration of a base station according to the same embodiment.

First, an example of a configuration of the base station 100 according to the embodiment will be described with reference to FIGS. 11 to 17. FIG. 11 is a block diagram showing the example of the configuration of the base station 100 according to the embodiment. Referring to FIG. 11, the base station 100 includes an antenna unit 110, a wireless communication unit 120, a network communication unit 130, a storage unit 140, and a processing unit 150.

(Antenna Unit 110)

The antenna unit 110 radiates signals output by the wireless communication unit 120 to a space as radio waves. In addition, the antenna unit 110 converts radio waves from a space into signals, and outputs the signals to the wireless communication unit 120.

For example, the antenna unit 110 includes an antenna for a cellular band and an antenna for a wireless LAN band.

(Wireless Communication Unit 120)

(a) Transmission and Reception of Signals

The wireless communication unit 120 transmits and receives signals.

Terminal Device

For example, the wireless communication unit 120 transmits a downlink signal to a terminal device that is positioned within the cell 11. For example, the wireless communication unit 120 uses the cellular band and/or the wireless LAN band and transmits a downlink signal.

In addition, for example, the wireless communication unit 120 receives an uplink signal from a terminal device that is positioned within the cell 11. For example, the wireless communication unit 120 uses the cellular band and receives an uplink signal. The wireless communication unit 120 may use the wireless LAN band and receive an uplink signal.

Wireless LAN Access Point

For example, the wireless communication unit 120 receives a signal from the wireless LAN access point. For example, the wireless communication unit 120 uses the wireless LAN band and receives a signal from the wireless LAN access point.

The wireless communication unit 120 may transmit a signal to the wireless LAN access point. For example, the wireless communication unit 120 may use the wireless LAN band and transmit a signal to the wireless LAN access point.

Radar Waves

For example, the wireless communication unit 120 receives radar waves. For example, the wireless communication unit 120 uses the wireless LAN band and receives radar waves. In particular, the wireless LAN band is a channel for which DFS is requested (hereinafter referred to as a "DFS channel").

(b) Example of a Detailed Configuration of a Wireless Communication Unit

For example, the wireless communication unit 120 includes a transmission and reception unit for a cellular band and a transmission and reception unit for a wireless LAN band. As an example, the cellular band is a frequency band of a 2.1 GHz band and the wireless LAN band is a frequency band of a 5 GHz band. Hereinafter, this will be described with reference to a specific example of FIG. 12.

Figure 12:
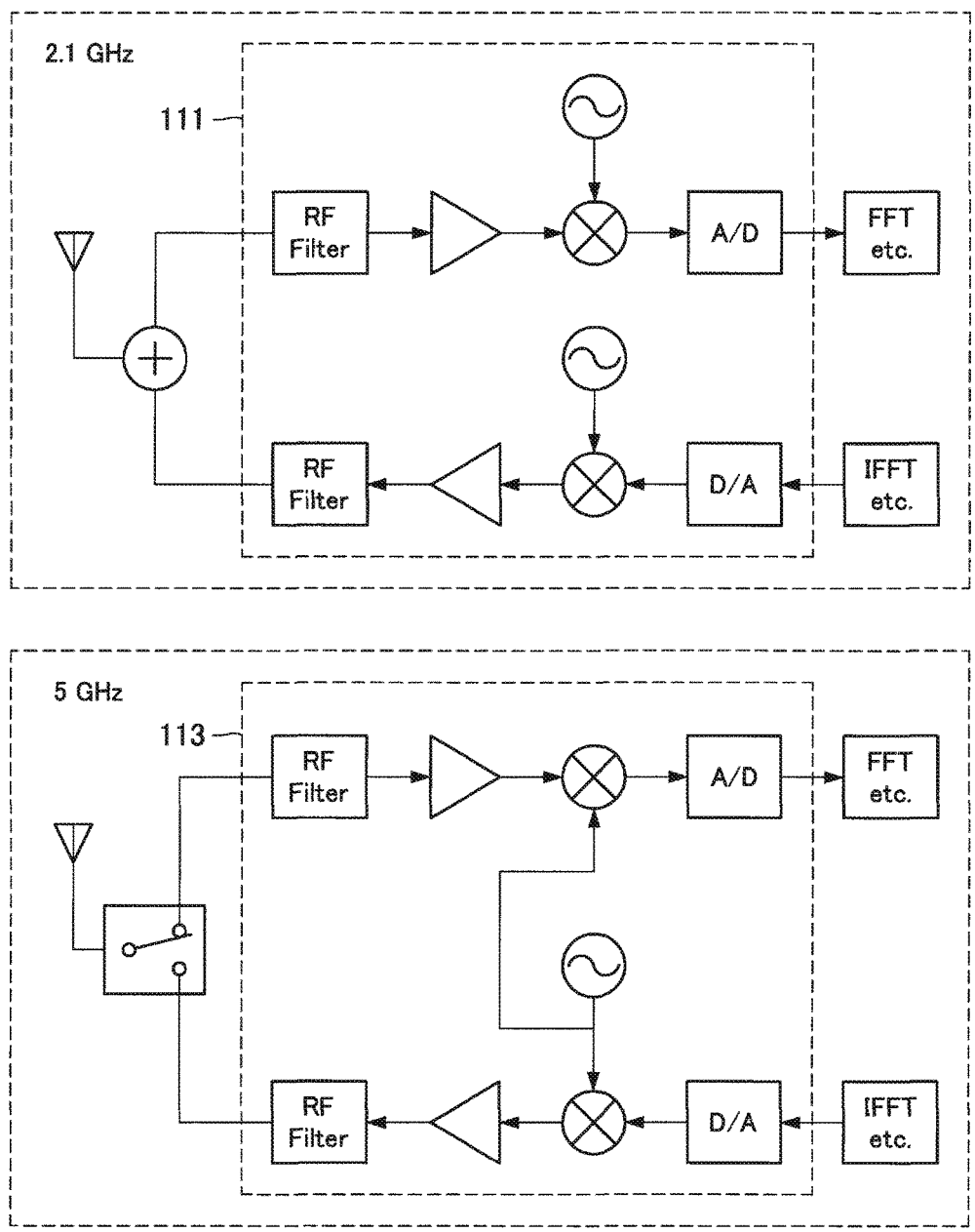
FIG. 12 is an illustrative diagram for describing a first example of a transmission and reception unit included in a wireless communication unit.

FIG. 12 is an illustrative diagram for describing a first example of a transmission and reception unit included in the wireless communication unit 120. As illustrated in FIG. 12, a transmission and reception unit for a cellular band 111 and a transmission and reception unit for a wireless LAN band 113 are shown. For example, in this manner, the transmission and reception unit for a cellular band 111 includes a reception unit of one system and a transmission unit of one system. In addition, the transmission and reception unit for a wireless LAN band 113 includes a reception unit of one system and a transmission unit of one system. For example, a reception unit of one system of the transmission and reception unit for a wireless LAN band 113 may receive signals and radar waves from the wireless LAN access point.

FIG. 13 is an illustrative diagram for describing a second example of a transmission and reception unit included in the wireless communication unit 120. As illustrated in FIG. 13, the transmission and reception unit for a cellular band 111 and a transmission and reception unit for a wireless LAN band 115 are shown. Similarly to the example of FIG. 12, the transmission and reception unit for a cellular band 111 includes a reception unit of one system and a transmission unit of one system. In particular, in this example, the transmission and reception unit for a wireless LAN band 115 includes reception units of two systems and a transmission unit of one system. For example, a reception unit of one system of the transmission and reception unit for a wireless LAN band 115 receives signals and radar waves from the wireless LAN access point, and a reception unit of the other system of the transmission and reception unit 115 may receive an uplink signal from a terminal device at the same time. That is, when such reception units of two systems are used, it is possible to receive signals and radar waves from the wireless LAN access point while the wireless LAN band is used as an uplink band in the cellular system.

(Network Communication Unit 130)

The network communication unit 130 communicates with another node. For example, the network communication unit 130 communicates with a core network node of the core network 20. In addition, for example, the network communication unit 130 communicates with another base station.

(Storage Unit 140)

The storage unit 140 temporarily or permanently stores programs and data for operations of the base station 100.

(Processing Unit 150)

The processing unit 150 provides various functions of the base station 100. The processing unit 150 includes a discovery unit 151, an information acquisition unit 153, a communication control unit 155 and a monitoring unit 157.

(Discovery Unit 151)

The discovery unit 151 discovers a wireless LAN access point that uses a wireless LAN band.

(a) Wireless LAN Band

For example, the wireless LAN band is a wireless LAN channel. For example, the channel is a channel whose bandwidth is 20 MHz.

More specifically, for example, the channel is a channel for which DFS is requested (that is, a DFS channel).

(b) Detection of a Frame

For example, the discovery unit 151 detects a frame transmitted by the wireless LAN access point and thus discovers the wireless LAN access point that uses the wireless LAN band.

Detection of a Beacon Frame

For example, the frame includes a beacon frame transmitted by the wireless LAN access point. That is, the discovery unit 151 detects the beacon frame and thus discovers the wireless LAN access point that uses the wireless LAN band. For example, the discovery unit 151 discovers the wireless LAN access point through the passive scan.

Detection from a Waveform

As a first example, the discovery unit 151 detects a beacon frame from a waveform of a signal. Hereinafter, an example of a waveform of a signal of a beacon frame will be described with reference to FIG. 14.

Figure 14:
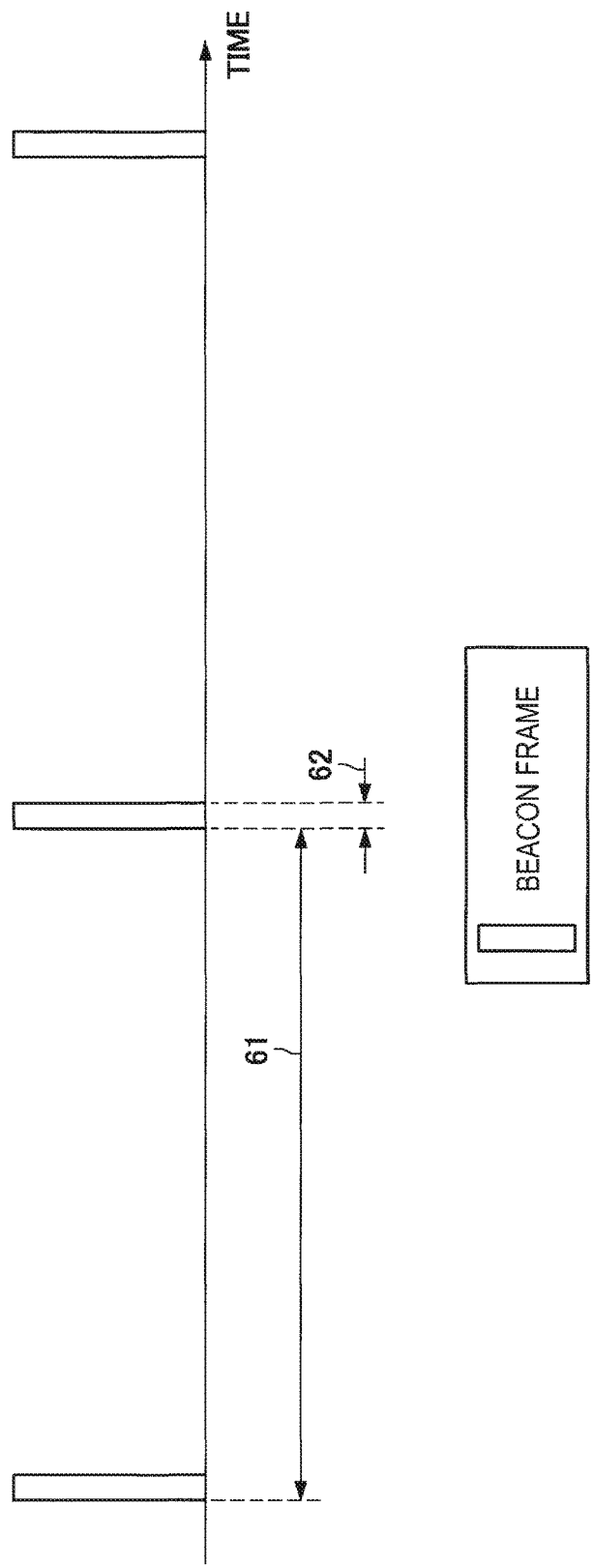
FIG. 14 is an illustrative diagram for describing an example of a waveform of a signal of a beacon frame.

FIG. 14 is an illustrative diagram for describing an example of a waveform of a signal of a beacon frame. As illustrated in FIG. 14, a waveform of a signal of a beacon frame transmitted at a beacon interval 61 is shown. The beacon interval 61 is, for example, about 100 ms. The signal has a width 62 that is several tens of microseconds. The discovery unit 151 detects, for example, such a waveform of a signal, and thus detects the beacon frame.

Since a waveform of a pulse of radar waves is different from the waveform of the signal of the beacon frame, the discovery unit 151 can distinguish both. Hereinafter, an example of a waveform of a pulse of radar wave will be described with reference to FIG. 15.

Figure 15:
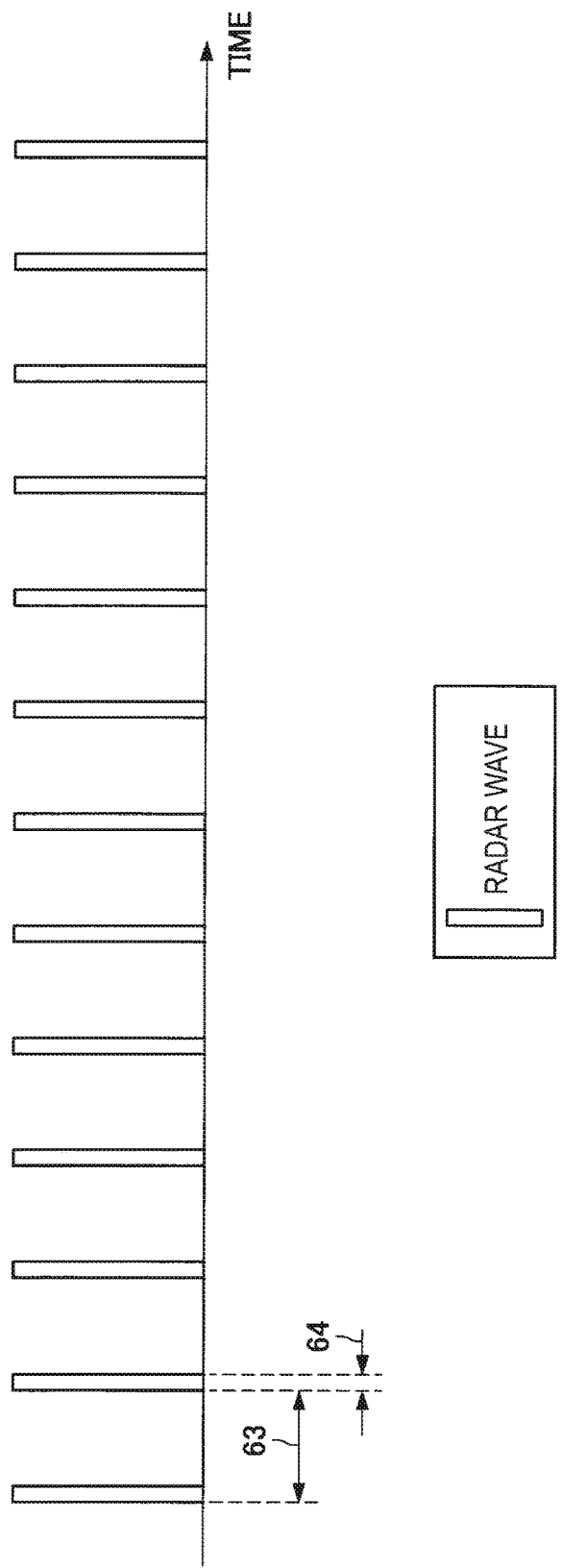
FIG. 15 is an illustrative diagram for describing an example of a waveform of a pulse of radar waves.

FIG. 15 is an illustrative diagram for describing an example of a waveform of a pulse of radar waves. As illustrated in FIG. 15, a waveform of a pulse of radar waves transmitted at a pulse interval 63 is shown. The pulse interval 63 is, for example, 1.4 ms, and a width 63 of the pulse is 1 microsecond. In this manner, the pulse interval 63 is significantly shorter than the beacon interval 61, and a width 64 of the pulse is significantly shorter than the width 62 of the signal of the beacon frame. Therefore, the discovery unit 151 can distinguish the signal of the beacon frame and the radar waves.

Detection from a Preamble

As a second example, the discovery unit 151 may detect a beacon frame from a preamble added to a head of the beacon frame.

More specifically, for example, a physical layer convergence protocol (PLCP) preamble and a PLCP header are added to a head of the beacon frame that is a MAC frame. Therefore, the discovery unit 151 detects the PLCP preamble and thus can detect the beacon frame.

Header of a MAC Frame

As a third example, the discovery unit 151 may detect a beacon frame from a header of the MAC frame.

More specifically, for example, the beacon frame that is the MAC frame includes a value indicating a type and a subtype of a frame in a frame control field. Therefore, the discovery unit 151 detects a value indicating the beacon frame in the frame control field and thus can detect the beacon frame.

For example, as described above, the discovery unit 151 detects the beacon frame and thus discovers the wireless LAN access point that uses the wireless LAN band. Accordingly, for example, the base station 100 can discover the wireless LAN access point without transmitting a signal of a wireless LAN.

Detection of a Probe Response Frame

For example, the frame includes a probe response frame transmitted by the wireless LAN access point. That is, the discovery unit 151 detects the probe response frame and thus discovers the wireless LAN access point that uses the wireless LAN band. For example, the discovery unit 151 discovers the wireless LAN access point by the active scan.

More specifically, for example, the processing unit 150 (for example, the discovery unit 151) generates a probe request frame and transmits the probe request frame to the wireless communication unit 120. Then, the discovery unit 151 detects a probe response frame. For example, the probe response frame that is the MAC frame includes a value indicating a type and a subtype of a frame in a frame control field. Therefore, the discovery unit 151 detects a value indicating the probe response frame in the frame control field and thus can detect the probe response frame.

For example, as described above, the discovery unit 151 detects the probe response frame and thus discovers the wireless LAN access point that uses the wireless LAN band. Accordingly, for example, it is possible to discover the wireless LAN access point that does not transmit the beacon frame.

For example, the discovery unit 151 generates a result of discovery (hereinafter referred to as a "discovery result") of the wireless LAN access point that uses the wireless LAN band. For example, when the wireless LAN access point that uses the wireless LAN band is discovered, the discovery unit 151 generates a discovery result indicating that the wireless LAN access point that uses the wireless LAN band is discovered. On the other hand, when the wireless LAN access point that uses the wireless LAN band is not discovered, the discovery unit 151 generates a discovery result indicating that the wireless LAN access point that uses the wireless LAN band is not discovered.

(c) Wireless LAN Access Point in the Vicinity of a Base Station

For example, the discovered wireless LAN access point is an access point that is positioned in the vicinity of the base station 100. That is, the discovery unit 151 discovers the wireless LAN access point that is a wireless LAN access point that uses the wireless LAN band and is positioned in the vicinity of the base station 100.

More specifically, for example, the discovery unit 151 attempts to detect a frame (for example, a beacon frame or a probe response frame) that is transmitted by a wireless LAN access point that uses the wireless LAN band. Then, for example, when the frame is detected, the discovery unit 151 determines whether the wireless LAN access point that has transmitted the frame is positioned in the vicinity of the base station 100. As an example, the discovery unit 151 calculates a propagation loss of the frame from transmission power indicated by a TPC report included in the frame and reception power of the frame. Then, the discovery unit 151 determines whether the wireless LAN access point that has transmitted the frame is positioned in the vicinity of the base station 100 based on the propagation loss. For example, when the propagation loss is less than a predetermined threshold, the discovery unit 151 determines that the wireless LAN access point that has transmitted the frame is positioned in the vicinity of the base station 100. As a result, the discovery unit 151 discovers the wireless LAN access point that is positioned in the vicinity of the base station 100. When the propagation loss is greater than the predetermined threshold, the discovery unit 151 determines that the wireless LAN access point that has transmitted the frame is not positioned in the vicinity of the base station 100.

Accordingly, for example, it is possible to know whether the wireless LAN access point positioned in the vicinity of the base station 100 uses the wireless LAN band.

The present embodiment is not limited to the above-described examples. For example, more simply, when the frame is detected, the discovery unit 151 may discover the wireless LAN access point that uses the wireless LAN band. On the other hand, when the frame is not detected, the discovery unit 151 may not discover the wireless LAN access point that uses the wireless LAN band.

(d) Trigger of Operation

For example, when use of the wireless LAN band by the base station 100 is decided, the communication control unit 155 selects a wireless LAN band. Then, the discovery unit 151 attempts to discover the wireless LAN access point that uses the selected wireless LAN.

For example, the discovery unit 151 attempts to discover the wireless LAN access point that uses the selected wireless LAN under control of the communication control unit 155. That is, the communication control unit 155 performs control such that the discovery unit 151 attempts to discover the wireless LAN access point that uses the selected wireless LAN.

For example, when radio resources for the base station 100 are insufficient (for example, when traffic is very high), use of the wireless LAN band by the base station 100 is decided. Decision of use of the wireless LAN band by the base station 100 may be performed by the base station 100 (for example, the communication control unit 155) or the core network node.

(Information Acquisition Unit 153)

The information acquisition unit 153 acquires a result of discovery (that is, the discovery result) of the wireless LAN access point that uses the wireless LAN band.

For example, the discovery unit 151 generates the discovery result and the information acquisition unit 153 acquires the discovery result. For example, as described above, the discovery result indicates that the wireless LAN access point that uses the wireless LAN band is discovered or the wireless LAN access point that uses the wireless LAN band is not discovered.

It is needless to say that the discovery result is not necessarily information (for example, a string) having its own meaning, but is any piece of information that is generated or set according to detection of the frame. For example, the discovery result may be a first value or a second value. Then, when the discovery result is the first value, it indicates that the wireless LAN access point that uses the wireless LAN band is discovered. When the discovery result is the second value, it may indicate that the wireless LAN access point that uses the wireless LAN band is not discovered. As an example, the first value is 0, and the second value may be 1.

(Communication Control Unit 155)

(a) Control of Monitoring of Radar Waves

Before use of the wireless LAN band by the base station 100 starts, the communication control unit 155 controls monitoring of radar waves in the wireless LAN band based on the discovery result.

(a-1) Wireless LAN Band

As described above, for example, the wireless LAN band is a band selected by the communication control unit 155. Specifically, for example, when use of the wireless LAN band by the base station 100 is decided, the communication control unit 155 selects a wireless LAN band from among a plurality of wireless LAN bands. Then, the communication control unit 155 performs control such that the discovery unit 155 attempts to discover the wireless LAN access point that uses the selected wireless LAN band.

(a-2) Monitoring of Radar Waves

For example, the monitoring (that is, monitoring of radar waves in the wireless LAN band) is monitoring for a predetermined period.

More specifically, for example, the monitoring is channel availability check of DFS. As an example, the monitoring is monitoring of radar waves for 60 seconds in the wireless LAN band.

According to such monitoring, for example, it is possible to suppress interference with radar waves by the base station 100.

(a-3) Control According to a Discovery Result

When a Wireless LAN Access Point is Discovered

For example, when the wireless LAN access point that uses the wireless LAN band is discovered, the communication control unit 155 controls the monitoring such that the monitoring is not performed before use of the wireless LAN band by the base station 100 starts. That is, when the wireless LAN access point that uses the wireless LAN band is discovered, the base station 100 does not perform the monitoring (that is, monitoring of radar waves in the wireless LAN band) before use of the wireless LAN band by the base station 100 starts.

More specifically, for example, when the wireless LAN access point that uses the wireless LAN band is discovered, the communication control unit 155 does not trigger the monitoring (that is, monitoring of radar waves in the wireless LAN band). More specifically, for example, when the wireless LAN access point that uses the wireless LAN band is discovered, the communication control unit 155 causes the monitoring unit 157 not to perform the monitoring. As a result, the base station 100 does not perform the monitoring.

In addition, for example, when the wireless LAN access point that uses the wireless LAN band is discovered, the communication control unit 155 starts use of the wireless LAN band by the base station 100 without the monitoring (that is, monitoring of radar waves in the wireless LAN band). Use of the wireless LAN band by the base station 100 will be described below.

As described above, when the wireless LAN access point that uses the wireless LAN band is discovered, monitoring of radar waves in the wireless LAN band is not performed, and use of the wireless LAN band by the base station 100 starts. Accordingly, for example, it is possible to start use of the wireless LAN band in the cellular system 1 more quickly.

More specifically, when there is a wireless LAN access point that uses the wireless LAN band, it means that radar waves using the wireless LAN band are not detected. Therefore, when the wireless LAN access point that uses the wireless LAN band is discovered, even if the base station 100 uses the wireless LAN band without monitoring of radar waves in the wireless LAN band, radar waves are not interfered with. Therefore, the base station 100 can use the wireless LAN band in the cellular system 1 more quickly while suppressing interference with radar waves.

When a Wireless LAN Access Point is not Discovered

For example, when the wireless LAN access point that uses the wireless LAN band is not discovered, the communication control unit 155 controls the monitoring such that the monitoring is performed before use of the wireless LAN band by the base station 100 starts. That is, when the wireless LAN access point that uses the wireless LAN band is not discovered, the base station 100 performs the monitoring (that is, monitoring of radar waves in the wireless LAN band) before use of the wireless LAN band by the base station 100 starts.

More specifically, for example, when the wireless LAN access point that uses the wireless LAN band is not discovered, the communication control unit 155 triggers the monitoring (that is, monitoring of radar waves in the wireless LAN band). More specifically, for example, when the wireless LAN access point that uses the wireless LAN band is not discovered, the communication control unit 155 causes the monitoring unit 157 to perform the monitoring. As a result, the base station 100 (the monitoring 157) performs the monitoring. In addition, for example, the monitoring unit 157 generates a result of the monitoring (hereinafter referred to as a "monitoring result") and the communication control unit 155 acquires the monitoring result.

In addition, for example, when no radar waves are detected during monitoring of radar waves in the wireless LAN band, the communication control unit 155 starts use of the wireless LAN band by the base station 100. More specifically, for example, the monitoring 157 performs monitoring of radar waves in the wireless LAN band. As a result, for example, no radar waves are detected. In this case, the base station 100 (the communication control unit 155) starts use of the wireless LAN band. On the other hand, for example, radar waves are detected. In this case, the communication control unit 155 selects another wireless LAN band and the discovery unit 151 attempts to discover a wireless LAN access point that uses the selected other wireless LAN band. Use of the wireless LAN band by the base station 100 will be described below.

As described above, when the wireless LAN access point that uses the wireless LAN band is not discovered, monitoring of radar waves in the wireless LAN band is performed, and if radar waves are not detected during the monitoring, use of the wireless LAN band by the base station 100 starts. Accordingly, for example, it is possible to suppress interference with radar waves.

(b) Use of a Wireless LAN Band by the Base Station 100.

As described above, for example, when the wireless LAN access point that uses the wireless LAN band is discovered or when radar waves are not detected during monitoring of radar waves in the wireless LAN band, the communication control unit 155 starts use of the wireless LAN band by the base station 100.

(b-1) Use According to CSMA/CA

For example, the use of the wireless LAN band by the base station 100 is use of the wireless LAN band according to CSMA/CA. That is, the base station 100 uses the wireless LAN band according to CSMA/CA.

Specifically, for example, the base station 100 uses the wireless LAN band in order to transmit or receive a signal of the cellular system 1 within a period ensured by transmission of carrier sense and a predetermined frame (a frame for setting an NAV, for example, an RTS frame or a CTS frame). Hereinafter, this will be described with reference to a specific example of FIG. 16 and FIG. 17.

Figure 16:
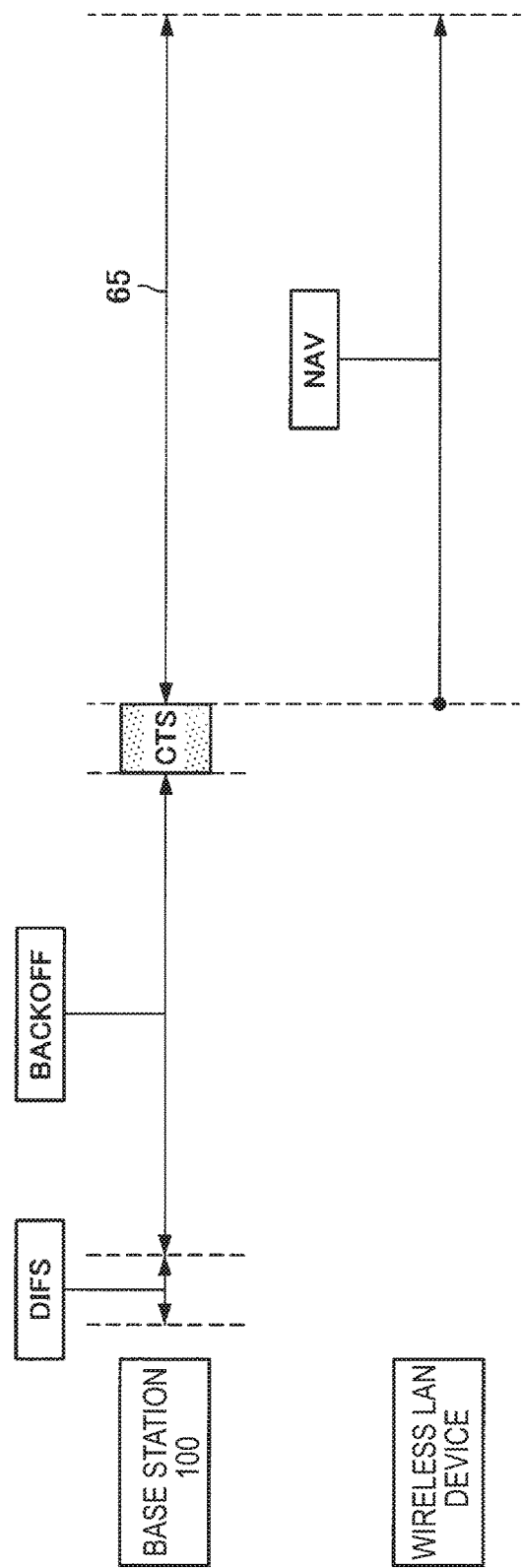
FIG. 16 is an illustrative diagram for describing a first use example of a wireless LAN band according to CSMA/CA.

FIG. 16 is an illustrative diagram for describing a first use example of a wireless LAN band according to CSMA/CA. As illustrated in FIG. 16, the base station 100 and a wireless LAN device (an access point or a station) are shown. The base station 100 ascertains that a signal is not transmitted during DIFS after the end of a busy period. Thereafter, the base station 100 further stands by for a backoff time that is randomly set, and when a signal is not transmitted during the backoff time, transmits the CTS frame. Then, the wireless LAN device receives the CTS frame, acquires a value included in a duration field of the CTS frame, and sets the value as an NAV. Then, the wireless LAN device holds transmission of a signal for a period until the NAV expires (that is, the NAV becomes 0). Therefore, the base station 100 uses the wireless LAN band in order to transmit or receive a signal of the cellular system 1 within a period 65 (that is, a period from the end of transmission of the CTS frame until the NAV expires) ensured by transmission of carrier sense and the CTS frame. The base station 100 may transmit or receive a signal of the cellular system 1 for the entire period 65 or may transmit or receive a signal of the cellular system 1 for a partial time of the period 65. The base station 100 may transmit the RTS frame instead of the CTS frame.

Figure 17:
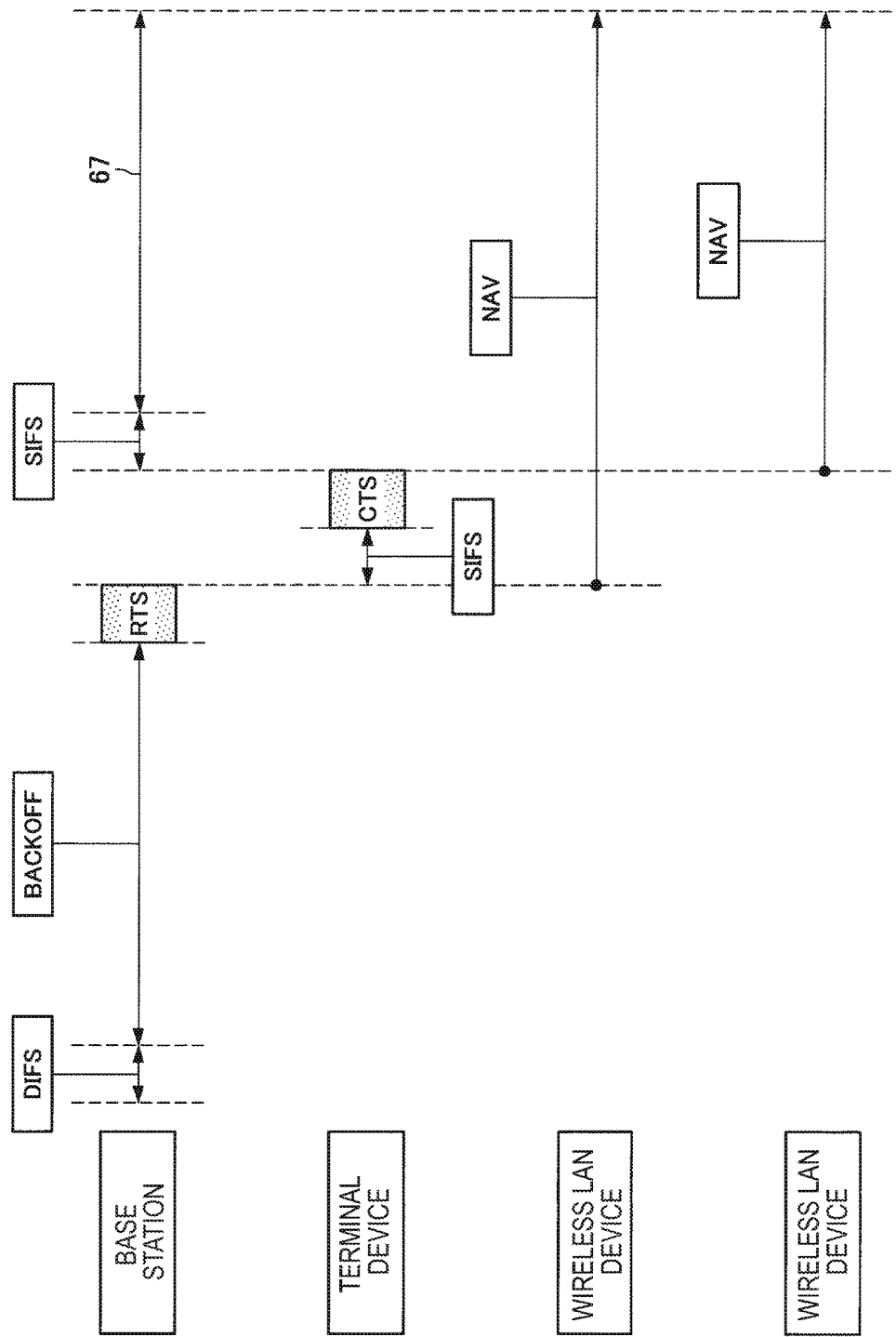
FIG. 17 is an illustrative diagram for describing a second use example of a wireless LAN band according to CSMA/CA.

FIG. 17 is an illustrative diagram for describing a second use example of a wireless LAN band according to CSMA/CA. As illustrated in FIG. 17, the base station 100, a terminal device and a wireless LAN device are shown. The base station 100 ascertains that a signal is not transmitted during DIFS after the end of a busy period. Thereafter, the base station 100 further stands by for a backoff time that is randomly set, and when a signal is not transmitted during the backoff time, transmits the RTS frame. Then, the wireless LAN device receives the RTS frame, acquires a value included in a duration field of the RTS frame, and sets the value as an NAV. As a result, the wireless LAN device holds transmission of a signal for a period until the NAV expires (that is, the NAV becomes 0). In addition, the terminal device (for example, a terminal device that performs wireless communication with the base station 100 using a cellular band) receives the RTS frame and transmits the CTS frame after SIFS from the end of the RTS frame. Then, the wireless LAN device receives the CTS frame, acquires a value included in a duration field of the CTS frame, and sets the value as an NAV. As a result, the wireless LAN device holds transmission of a signal for a period until the NAV expires (that is, the NAV becomes 0). Therefore, the base station 100 uses the wireless LAN band in order to transmit or receive a signal of the cellular system 1 within a period 67 (that is, a period from a time point after SIFS from the end of reception of the CTS frame until the NAV expires) ensured by transmission of carrier sense and the RTS frame. The base station 100 may transmit or receive a signal of the cellular system 1 for the entire period 67 and transmit or receive a signal of the cellular system 1 for a partial time of the period 67.

For example, the ensured period is a period of one or more subframes. Then, the base station 100 transmits or receives a signal of the cellular system 1 using the wireless LAN band through at least one subframe.

For example, as described above, the wireless LAN band according to CSMA/CA is used. Accordingly, for example, it is possible to use the wireless LAN band fairly with the wireless LAN device. In addition, for example, interference between the cellular system 1 and the wireless LAN is suppressed.

The use of the wireless LAN band according to CSMA/CA does not mean that the wireless LAN band is always used in order to transmit or receive a signal of the cellular system 1. As described above, the use of the wireless LAN band according to CSMA/CA means that the wireless LAN band is used in order to transmit or receive a signal of the cellular system 1 only when a period is ensured by transmission of carrier sense and a predetermined frame (a frame for setting an NAV) (that is, the wireless LAN band is intermittently used). In addition, start of the use of the wireless LAN band according to CSMA/CA means start of intermittent use of the wireless LAN band in this manner.

(b-2) Specific Process

As described above, for example, the communication control unit 155 starts use of the wireless LAN band by the base station 100.

Activation

As an example, the communication control unit 155 activates hardware and/or software for using the wireless LAN band.

Settings

As another example, the communication control unit 155 performs settings for the base station 100 to use the wireless LAN band. Specifically, for example, the communication control unit 155 performs settings of hardware and/or software for using the wireless LAN band (for example, settings of a frequency band).

Start of a Process

As still another example, the communication control unit 155 starts a process (hereinafter referred to as a "band use process") for using the wireless LAN band by the base station 100.

For example, the communication control unit 155 performs the band use process within the ensured period and does not perform the band use process outside the period. That is, the communication control unit 155 intermittently performs the band use process rather than continuously performing the band use process.

For example, the band use process includes processes of a radio resource control (RRC) layer, a packet data convergence protocol (PDCP), a radio link control (RLC) layer, a medium access control (MAC) layer, and/or a physical layer for the wireless LAN band.

As a specific example, the band use process includes allocation (that is, scheduling) of radio resources of the wireless LAN band and/or mapping of a signal to radio resources (for example, a resource block) of the wireless LAN band.

Resource Allocation

For example, the communication control unit 155 allocates radio resources of the wireless LAN band. More specifically, for example, the communication control unit 155 allocates radio resources (for example, a resource block) of the wireless LAN band through at least one subframe within the ensured period.

Mapping of a Signal to Radio Resources

For example, the communication control unit 155 performs mapping of a signal to radio resources (for example, a resource block) of the wireless LAN band. More specifically, for example, the communication control unit 155 maps a control signal (for example, a synchronization signal, a reference signal, and other downlink control signals) and a data signal to radio resources of the wireless LAN band through at least one subframe within the ensured period.

The ensured period may be a short period. For example, the ensured period may be a period of about several subframes. In such a case, the base station 100 is unable to transmit a synchronization signal (a primary synchronization signal and a secondary synchronization signal) with a predetermined symbol within a radio frame and it may be difficult for the terminal device to acquire synchronization. Thus, for example, the communication control unit 155 may map a synchronization signal to radio resources for each subframe. That is, the base station 100 may transmit a synchronization signal (a primary synchronization signal and a secondary synchronization signal) for each subframe. Further, the communication control unit 155 may map the primary synchronization signal and the secondary synchronization signal such that a positional relation between the primary synchronization signal and the secondary synchronization signal is different for each subframe. Accordingly, the terminal device can acquire synchronization in units of subframes. The terminal device may estimate a channel based on a reference signal transmitted through at least one subframe within the ensured period.

(b-3) Use as a CC

For example, the use of the wireless LAN band by the base station 100 is use of the wireless LAN band as a component carrier (CC) of carrier aggregation. That is, the base station 100 uses the wireless LAN band as the CC of the carrier aggregation.

Specifically, for example, the base station 100 uses the wireless LAN band as the CC for a period ensured by transmission of carrier sense and a predetermined frame (a frame for setting an NAV, for example, an RTS frame or a CTS frame).

For example, the base station 100 uses the entire wireless LAN band as one CC. As another example, the base station 100 may use some of the wireless LAN band as one CC. As still another example, the communication control unit 155 may use a part of the wireless LAN band as a first CC and use another part of the wireless LAN band as a second CC.

SCC

For example, the use of the wireless LAN band by the base station 100 is use of the wireless LAN band as a secondary component carrier (SCC) of carrier aggregation. That is, the base station 100 uses the wireless LAN band as the SCC of the carrier aggregation.

More specifically, for example, the communication control unit 155 activates a CC, which is a part or all of the wireless LAN band, as an SCC for the terminal device.

In addition, for example, the communication control unit 155 performs cross-carrier scheduling such that scheduling information (resource allocation information) about a CC, which is a part or all of the wireless LAN band, is transmitted using a cellular band.

In addition, for example, when handover decision is performed, the communication control unit 155 does not select a CC, which is a part or all of the wireless LAN band, as a handover target CC. In addition, for example, the communication control unit 155 does not arrange a random access channel in a CC, which is a part or all of the wireless LAN band.

As described above, a part or all of the wireless LAN band is used as an SCC. Accordingly, for example, it is possible to suppress an increase of PCC handover. More specifically, for example, the wireless LAN band is intermittently used. Therefore, when a part or all of the wireless LAN band is used as a PCC for the terminal device, PCC handover may be frequently performed. That is, the number of PCC handovers may increase. Therefore, by using a part or all of the wireless LAN band as an SCC for the terminal device, an increase of the number of PCC handovers may be suppressed.

Duplex Scheme

TDD

For example, a duplex scheme of the base station 100 is time division duplex (TDD). In this case, the base station 100 uses a CC, which is a part or all of the wireless LAN band, as a downlink and uplink CC.

FDD

A duplex scheme of the base station 100 may be frequency division duplex (FDD). In this case, the base station 100 may use a CC, which is a part or all of the wireless LAN band, as a downlink CC. Alternatively, the base station 100 may use the CC as an uplink CC.

(Monitoring Unit 157)

The monitoring unit 157 performs monitoring of radar waves in the wireless LAN band.

(a) Monitoring

For example, the monitoring (that is, monitoring of radar waves in the wireless LAN band) is monitoring for a predetermined period.

More specifically, for example, the monitoring is channel availability check of DFS. As an example, the monitoring is monitoring of radar waves for 60 seconds in the wireless LAN band.

According to such monitoring, for example, it is possible to suppress interference with radar waves by the base station 100.

(b) Specific Process

For example, the monitoring unit 157 attempts to detect radar waves in the wireless LAN band for a predetermined period as the monitoring. As an example, the monitoring unit 157 attempts to detect radar waves from a waveform of a signal. For example, a waveform of a pulse of radar waves is shown in the example of FIG. 15.

For example, the monitoring unit 157 generates a result of the monitoring (that is, a monitoring result). For example, when radar waves are detected during the monitoring, the monitoring unit 157 generates a monitoring result indicating that radar waves are detected during the monitoring. On the other hand, for example, when no radar waves are detected during the monitoring, the monitoring unit 157 generates a monitoring result indicating that no radar waves are detected during the monitoring.

(c) Trigger of Operation

For example, the monitoring unit 157 performs monitoring of radar waves in the wireless LAN band under control of the communication control unit 155. That is, the communication control unit 155 causes the monitoring unit 157 to perform monitoring of radar waves in the wireless LAN band.

4. PROCESS FLOW

Examples of processes according to the present embodiment will be described with reference to FIG. 18 to FIG. 20.

(Overall Process)

Figure 18:
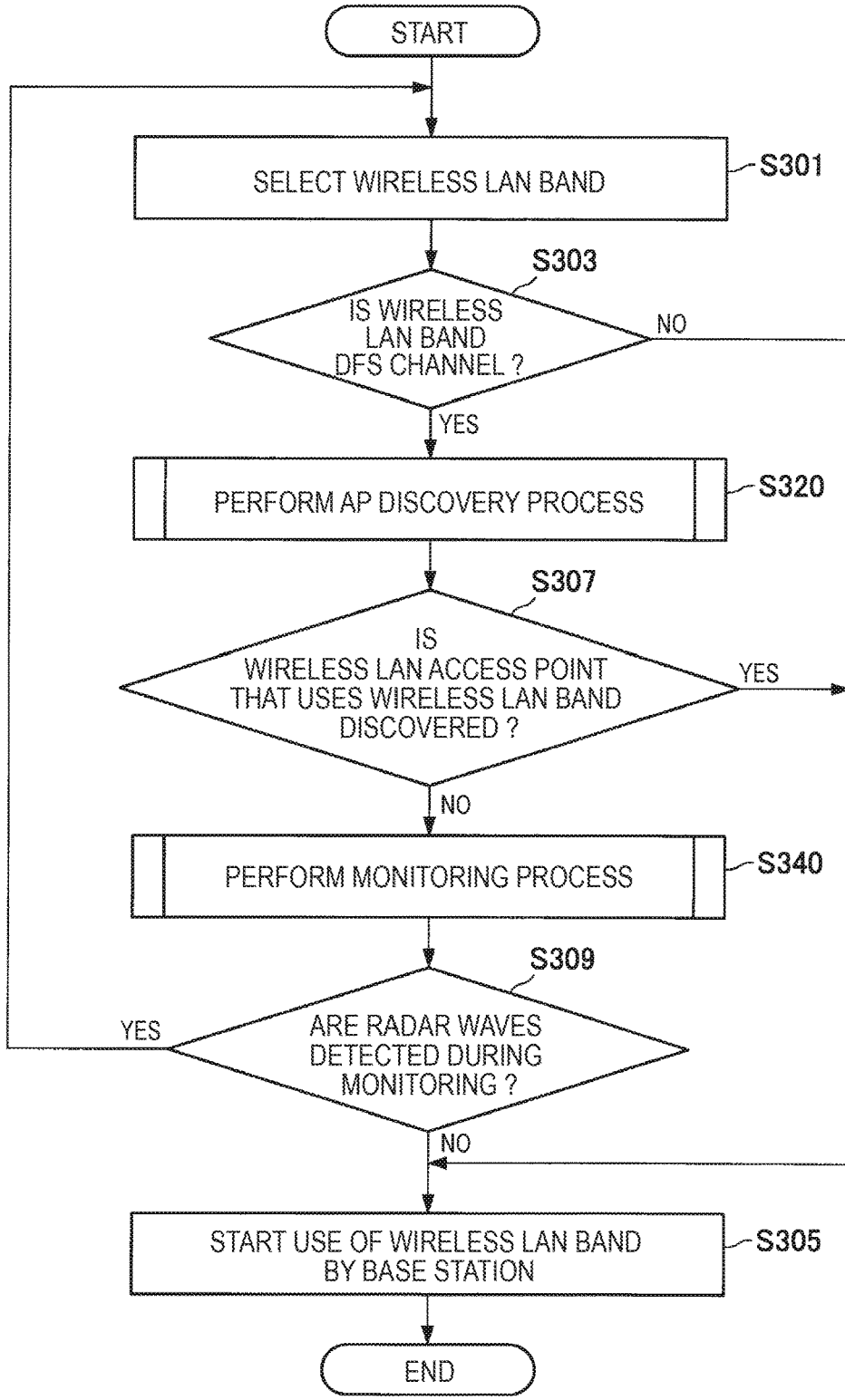
FIG. 18 is a flowchart showing an example of a schematic flow of a process according to the same embodiment.

FIG. 18 is a flowchart showing an example of a schematic flow of a process according to the present embodiment. For example, when use of the wireless LAN band by the base station 100 is decided, the process is performed.

The communication control unit 155 selects a wireless LAN band (S301).

When the wireless LAN band is not a DFS channel (NO in S303), the communication control unit 155 starts use of the wireless LAN band by the base station 100 (S305). Then, the process ends.

On the other hand, when the wireless LAN band is a DFS channel (YES in S303), the communication control unit 155 causes the discovery unit 151 to perform a discovery process (S320). That is, the discovery unit 151 attempts to discover a wireless LAN access point that uses the wireless LAN band.

In the above discovery process, when the wireless LAN access point that uses the wireless LAN band is discovered (YES in S307), the communication control unit 155 starts use of the wireless LAN band by the base station 100 (S305). Then, the process ends.

On the other hand, in the discovery process, when the wireless LAN access point that uses the wireless LAN band is not discovered (NO in S307), the communication control unit 155 causes the monitoring unit 157 to perform a monitoring process (S340). That is, the monitoring unit 157 performs monitoring of radar waves in the wireless LAN band.

When no radar waves are detected during the monitoring (NO in S309), the communication control unit 155 starts use of the wireless LAN band by the base station 100 (S305). Then, the process ends.

On the other hand, when the radar waves are detected during the monitoring (YES in S309), the process returns to Step S301, and the communication control unit 155 selects another wireless LAN band (S301). Then, the process is repeated.

(AP Discovery Process)

Figure 19:
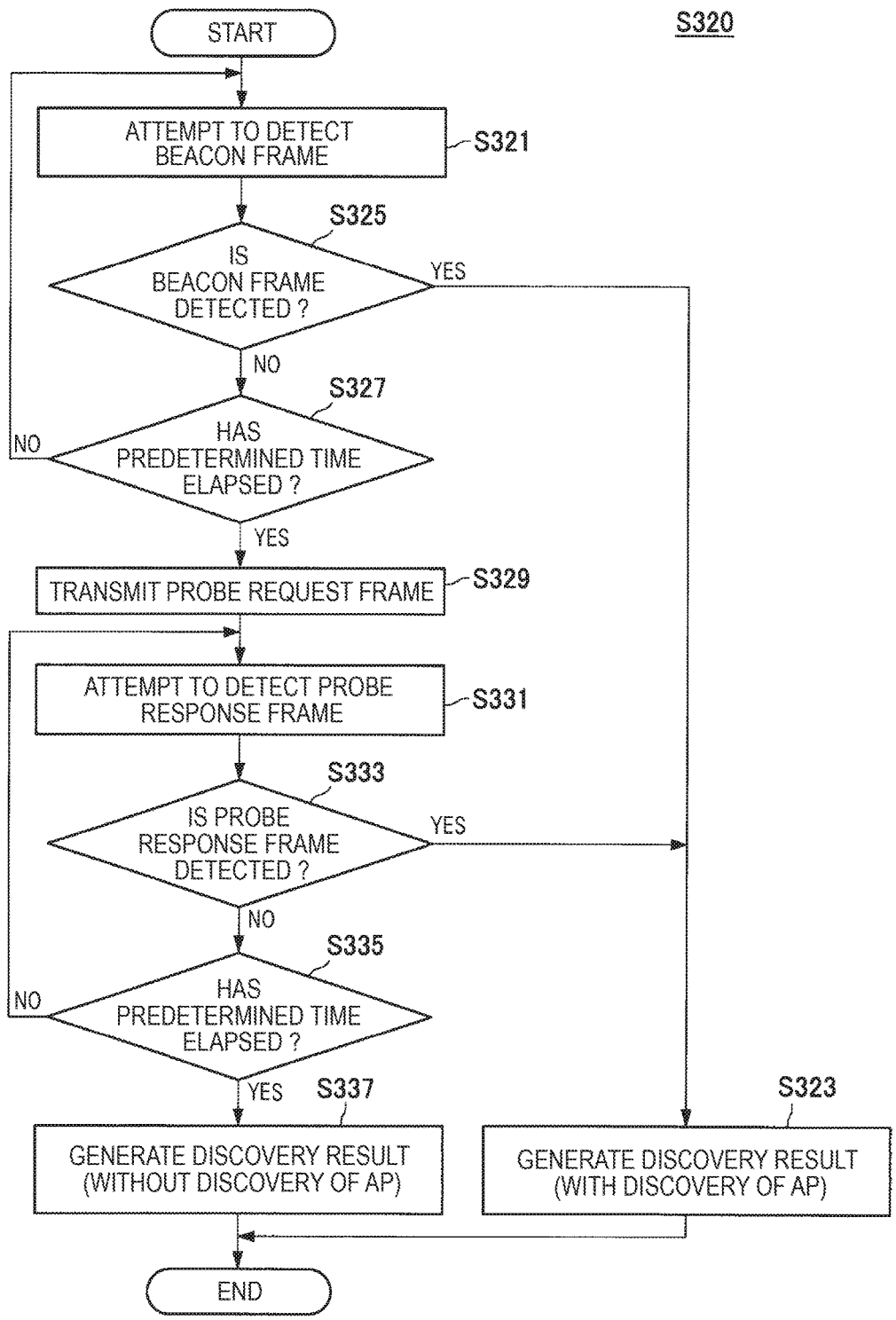
FIG. 19 is a flowchart showing an example of a schematic flow of an AP discovery process according to the same embodiment.

FIG. 19 is a flowchart showing an example of a schematic flow of an AP discovery process according to the present embodiment.

The discovery unit 151 uses a wireless LAN band and attempts to detect a beacon frame transmitted by a wireless LAN access point (S321).

When the beacon frame is detected (YES in S325), the discovery unit 151 generates a discovery result indicating that the wireless LAN access point that uses the wireless LAN band is discovered (S323). Then, the process ends.

When the beacon frame is not detected (NO in S325), if a predetermined period has not elapsed (NO in S327), the process returns to Step S321.

When the predetermined period has elapsed (YES in S327), the processing unit 150 (for example, the communication control unit 155) generates a probe request frame and transmits the probe request frame to the wireless communication unit 120 (S329).

Then, the discovery unit 151 attempts to detect a probe response frame transmitted by the wireless LAN access point that uses the wireless LAN band (S331).

When the probe response frame is detected (YES in S333), the discovery unit 151 generates a discovery result indicating that the wireless LAN access point that uses the wireless LAN band is discovered (S323). Then, the process ends.

When the probe response frame is not detected (NO in S333), if a predetermined period has not elapsed (NO in S335), the process returns to Step S331.

When the predetermined period has elapsed (YES in S335), the discovery unit 151 generates a discovery result indicating that the wireless LAN access point that uses the wireless LAN band is not discovered (S337). Then, the process ends.

(Monitoring Process)

Figure 20:
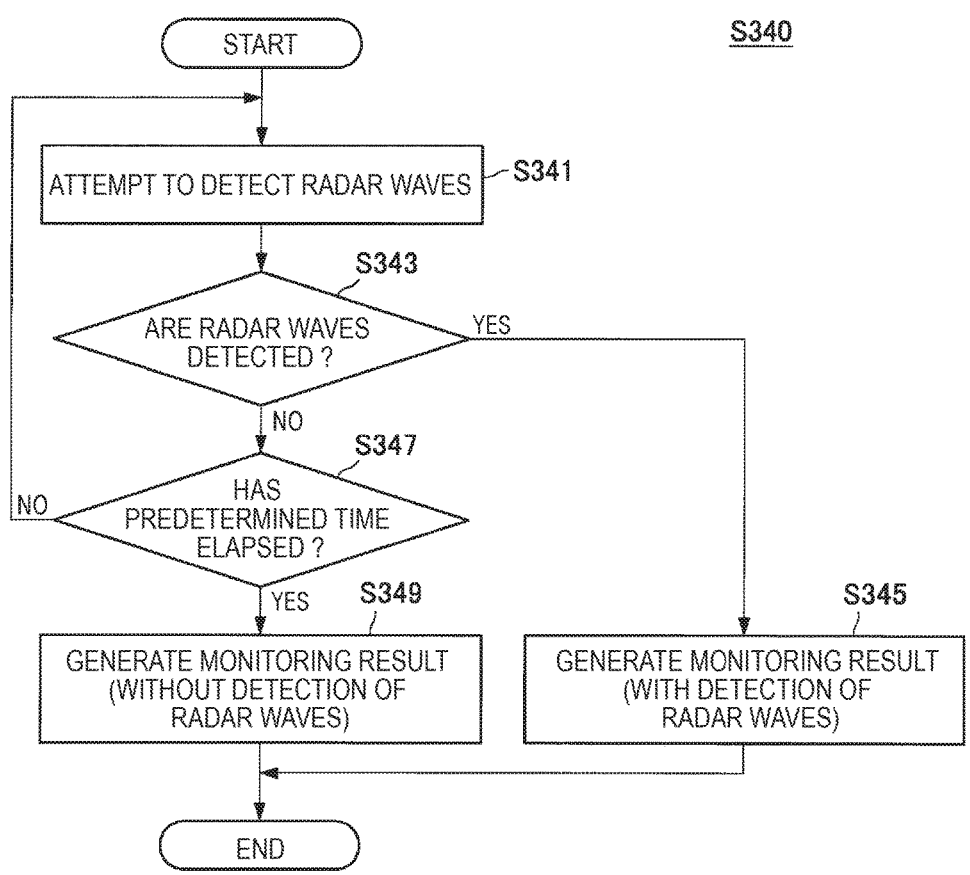
FIG. 20 is a flowchart showing an example of a schematic flow of a monitoring process according to the same embodiment.

FIG. 20 is a flowchart showing an example of a schematic flow of a monitoring process according to the present embodiment.

The monitoring unit 157 attempts to detect radar waves that are transmitted using the wireless LAN band (S341).

When the radar waves are detected (YES in S343), the monitoring unit 157 generates a monitoring result indicating that the radar waves are detected during monitoring (S345). Then, the process ends.

When the radar waves are not detected (NO in S343), if a predetermined period has not elapsed (NO in S347), the process returns to Step S341.

When the predetermined period has elapsed (YES in S347), the monitoring unit 157 generates a monitoring result indicating that the radar waves are not detected during monitoring (S349). Then, the process ends.

5. APPLICATION EXAMPLES

The technology according to the present disclosure is applicable to a variety of products. For example, the base station 100 may be implemented as any type of evolved Node B (eNB) such as a macro eNB or a small eNB. Small eNBs may be, for example, pico eNBs, micro eNBs, or home (femto) eNBs that cover smaller cells than the macro cells. Instead, the base station 100 may be implemented as another type of base station such as a NodeB or a base transceiver stations (BTS). The base station 100 may include a main device (which is also referred to as a base station device) that controls wireless communication and one or more remote radio heads (RRHs) that are arranged at different places from that of the main device. In addition, various types of terminals such as a smartphone, a tablet personal computer (PC), a notebook PC and a portable/dongle type mobile router perform a base station function temporarily or semi-permanently and thus may be operated as the base station 100. Further, at least some components of the base station 100 may be implemented in a base station device or a module for a base station device.

First Application Example

Figure 21:
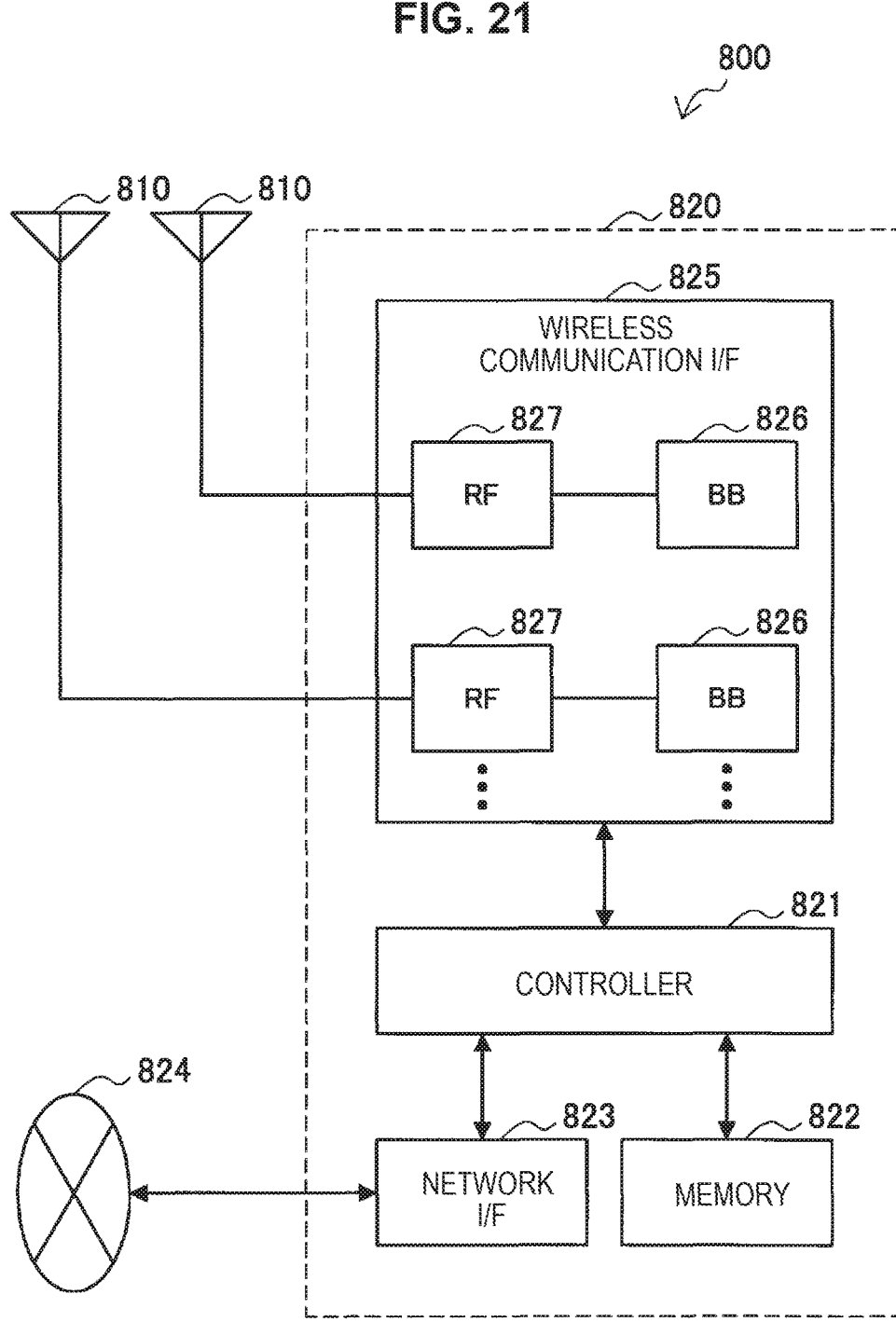
FIG. 21 is a block diagram showing a first example of a schematic configuration of an eNB.

FIG. 21 is a block diagram showing a first example of a schematic configuration of an eNB to which the technology according to the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (e.g. antenna elements included in a MIMO antenna) and is used for the base station device 820 to transmit and receive a wireless signal. The eNB 800 may include the plurality of the antennas 810 as shown in FIG. 21, and the plurality of antennas 810 may, for example, correspond to a plurality of frequency bands used by the eNB 800. FIG. 21 illustrates an example in which the eNB 800 includes the plurality of antennas 810, but the eNB 800 may include a single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, or scheduling. The control may be performed in cooperation with a surrounding eNB or a core network. The memory 822 includes a RAM and a ROM, and stores a program executed by the controller 821 and a variety of control data (e.g. a terminal list, transmission power data, and scheduling data).

The network interface 823 is a communication interface for connecting the base station device 820 to the core network 824. The controller 821 may communicate with a core network node or another eNB via the network interface 823. In this case, the controller 821 may be mutually connected to the eNB 800 and a core network node or another eNB through a logical interface (e.g. Si interface or X2 interface). The network interface 823 may be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides a wireless connection to a terminal positioned within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have a part or all of the logical functions as discussed above instead of the controller 821. The BB processor 826 may be a module including a memory having a communication control program stored therein, a processor to execute the program, and a related circuit, and the function of the BB processor 826 may be changeable by updating the program. The module may be a card or a blade to be inserted into a slot of the base station device 820, or a chip mounted on the card or the blade. Meanwhile, the RF circuit 827 may include a mixer, a filter, an amplifier, and the like, and transmits and receives a radio signal via the antenna 810.

The wireless communication interface 825 may include a plurality of BB processors 826 as shown in FIG. 21, and the plurality of BB processors 826 may, for example, correspond to a plurality of frequency bands used by the eNB 800. The wireless communication interface 825 also may include a plurality of RF circuits 827, as shown in FIG. 21, and the plurality of RF circuits 827 may, for example, correspond to a plurality of antenna elements. FIG. 21 illustrates an example in which the wireless communication interface 825 includes the plurality of BB processors 826 and the plurality of RF circuits 827, but the wireless communication interface 825 may include a single BB processor 826 or a single RF circuit 827.

Furthermore, the wireless communication interface 825 may support a wireless LAN communication scheme, in addition to a cellular communication scheme, and in this case, the interface may include a BB processor 826 and an RF circuit 827 of the wireless LAN communication scheme.

In the eNB 800 shown in FIG. 21, one or more constituent elements (for example, the discovery unit 151, the information acquisition unit 153, the communication control unit 155 and/or the monitoring unit 157) included in the processing unit 150 described with reference to FIG. 11 may be implemented in the wireless communication interface 825. Alternatively, at least some of the one or more constituent elements may be implemented by the controller 821. As an example, a module that includes a part (for example, the BB processor 826) or all of the wireless communication interface 825, and/or the controller 821 may be mounted in the eNB 800, and the module may implement the one or more constituent elements. In this case, the module may store a program for causing a processor to function as the one or more constituent elements (in other words, a program for causing a processor to execute the operations of the one or more constituent elements) to execute the program. As another example, a program for causing a processor to function as the one or more constituent elements may be installed in the eNB 800, and the wireless communication interface 825 (for example, the BB processor 826) and/or the controller 821 may execute the program. As described above, the eNB 800, the base station device 820, or the module may be provided as a device provided with the one or more constituent elements, and the program for causing a processor to function as the one or more constituent elements may be provided. In addition, a readable recording medium in which the program is recorded may be provided.

In addition, the wireless communication unit 120 described with reference to FIG. 11 may be implemented in the wireless communication interface 825 (for example, the RF circuit 827) in the eNB 800 shown in FIG. 21. In addition, the antenna unit 110 may be implemented in the antennas 810. In addition, the network communication unit 130 may be implemented in the controller 821 and/or the network interface 823.

Second Application Example

Figure 22:
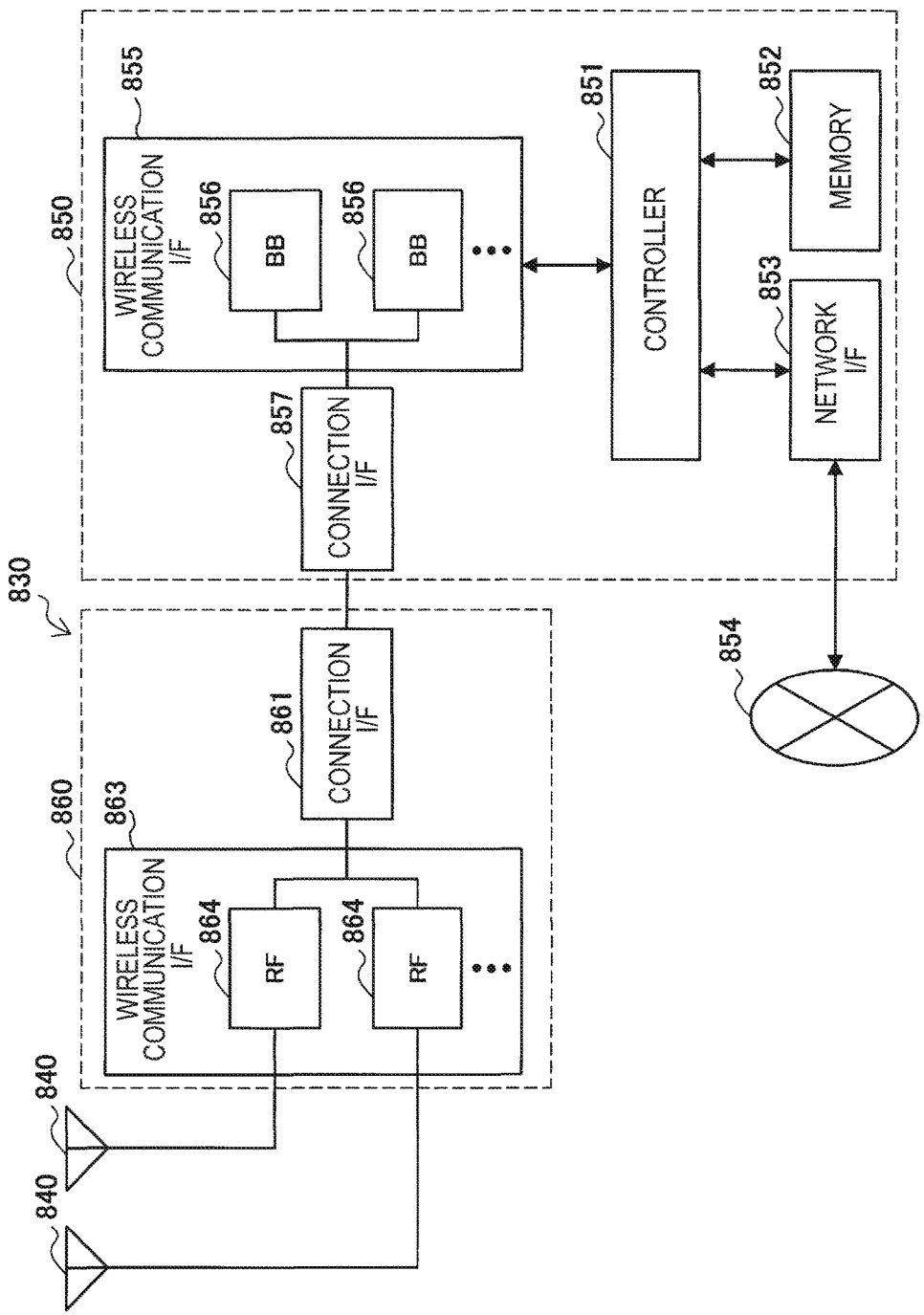
FIG. 22 is a block diagram showing a second example of a schematic configuration of an eNB.

FIG. 22 is a block diagram showing a second example of a schematic configuration of an eNB to which the technology according to the present disclosure may be applied. An eNB 830 includes one or more antennas 840, a base station device 850, and an RRH 860. Each of the antennas 840 and the RRH 860 may be connected to each other via an RF cable. The base station device 850 and the RRH 860 may be connected to each other by a high speed line such as optical fiber cables.

Each of the antennas 840 includes a single or a plurality of antenna elements (e.g. antenna elements included in a MIMO antenna), and is used for the RRH 860 to transmit and receive a wireless signal. The eNB 830 may include a plurality of the antennas 840 as shown in FIG. 22, and the plurality of antennas 840 may, for example, correspond to a plurality of frequency bands used by the eNB 830. FIG. 22 illustrates an example in which the eNB 830 includes the plurality of antennas 840, but the eNB 830 may include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 21.

The wireless communication interface 855 supports a cellular communication system such as LTE or LTE-Advanced, and provides a wireless connection to a terminal positioned in a sector corresponding to the RRH 860 via the RRH 860 and the antenna 840. The wireless communication interface 855 may typically include a BB processor 856. The BB processor 856 is the same as the BB processor 826 described with reference to FIG. 21 except that the BB processor 856 is connected to an RF circuit 864 of the RRH 860 via the connection interface 857. The wireless communication interface 855 may include a plurality of the BB processors 856, as shown in FIG. 22, and the plurality of BB processors 856 may, for example, correspond to a plurality of frequency bands used by the eNB 830 respectively. FIG. 22 illustrates an example in which the wireless communication interface 855 includes the plurality of BB processors 856, but the wireless communication interface 855 may include a single BB processor 856.

Furthermore, the wireless communication interface 855 may support a wireless LAN communication scheme, in addition to a cellular communication scheme, and in this case, the interface may include a BB processor 856 of the wireless LAN communication scheme.

The connection interface 857 connects the base station device 850 (wireless communication interface 855) to the RRH 860. The connection interface 857 may be a communication module for communication on the high speed line which connects the base station device 850 (wireless communication interface 855) to the RRH 860.

The RRH 860 includes a connection interface 861 and a wireless communication interface 863.

The connection interface 861 connects the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of RF circuits 864 as shown in FIG. 22, and the plurality of RF circuits 864 may, for example, correspond to a plurality of antenna elements. FIG. 22 illustrates an example in which the wireless communication interface 863 includes the plurality of RF circuits 864, but the wireless communication interface 863 may include a single RF circuit 864.

In the eNB 830 shown in FIG. 22, one or more constituent elements (for example, the discovery unit 151, the information acquisition unit 153, the communication control unit 155 and/or the monitoring unit 157) included in the processing unit 150 described with reference to FIG. 11 may be implemented in the wireless communication interface 855 and/or the wireless communication interface 863. Alternatively, these constituent elements may be implemented by the controller 851. As an example, a module that includes a part (for example, the BB processor 856) or all of the wireless communication interface 855, and/or the controller 851 may be mounted in the eNB 830, and the module may implement the one or more constituent elements. In this case, the module may store a program for causing a processor to function as the one or more constituent elements (in other words, a program for causing a processor to execute the operations of the one or more constituent elements) to execute the program. As another example, a program for causing a processor to function as the one or more constituent elements may be installed in the eNB 830, and the wireless communication interface 855 (for example, the BB processor 856) and/or the controller 851 may execute the program. As described above, the eNB 830, the base station device 850, or the module may be provided as a device provided with the one or more constituent elements, and the program for causing a processor to function as the one or more constituent elements may be provided. In addition, a readable recording medium in which the program is recorded may be provided.

In addition, the wireless communication unit 120 described, for example, with reference to FIG. 11 may be implemented in the wireless communication interface 863 (for example, the RF circuit 864) in the eNB 830 shown in FIG. 22. In addition, the antenna unit 110 may be implemented in the antennas 840. In addition, the network communication unit 130 may be implemented in the controller 851 and/or the network interface 853.

6. SUMMARY

The base station and the processes according to the embodiment of the present disclosure have been described above with reference to FIG. 7 to FIG. 22. According to the embodiment of the present disclosure, the base station 100 includes the information acquisition unit 153 configured to acquire a result of discovery of the wireless LAN access point that uses a frequency band (that is, a wireless LAN band) and the communication control unit 155 configured to control monitoring of radar waves in the frequency band based on the discovery result before use of the frequency band by the base station of the cellular system starts. Accordingly, for example, it is possible to start use of the frequency band that is used in the wireless LAN in the cellular system more quickly.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

While an example in which, for example, the base station includes the discovery unit (that is, the base station discovers the wireless LAN access point that uses the wireless LAN band) has been described, the present disclosure is not limited thereto. For example, another device positioned in the vicinity of the base station may include the discovery unit, and the device may transmit a discovery result to the base station.

In addition, while an example in which, for example, the base station includes the monitoring unit (that is, the base station performs monitoring of radar waves in the wireless LAN band) has been described, the present disclosure is not limited thereto. For example, another device positioned in the vicinity of the base station may include the monitoring unit, and the device may transmit a monitoring result to the base station.

In addition, while an example in which, for example, the base station transmits carrier sense and a predetermined frame (a frame for setting an NAV, for example, an RTS frame or a CTS frame) has been described, the present disclosure is not limited thereto. For example, another device positioned in the vicinity of the base station may transmit carrier sense and/or a predetermined frame instead of the base station.

While an example in which, for example, the base station uses the wireless LAN band according to CSMA/CA has been described, the present disclosure is not limited to thereto. The base station may use the wireless LAN band according to a method other than CSMA/CA.

Although an example in which the cellular system is a system that is compliant with LTE, LTE-Advanced, or a communication scheme that conforms to them is described, the present disclosure is not limited to such an example. For example, the cellular system may be a system that conforms to another communication standard.

Processing steps in the processing described herein do not necessarily have to be performed in the chronological order described in the flowcharts or sequence diagrams. For example, the processing steps in the processing may be performed in order different from the order described as the flowcharts or sequence diagrams, or may be performed in parallel.

In addition, a computer program for causing a processor (for example, a CPU, a DSP, or the like) provided in a base station of the present specification to function as constituent elements of the base station (for example, an information acquisition unit, or a communication control unit) (in other words, a computer program for causing the processor to execute the operations of the constituent elements of the base station) can also be produced. In addition, a storage medium storing the computer program may also be provided. Furthermore, a device provided with a memory storing the computer program and one or more processors that can execute the computer program (for example, a finished product, a module for a finished product (a part, a processing circuit, a chip, or the like)) may also be provided. In addition, a method including the operations of the constituent elements (for example, the information acquisition unit or the communication control unit) of the base station also belongs to the technology of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A device including:

an acquisition unit configured to acquire a result of discovery of a wireless local area network (LAN) access point that uses a frequency band; and a control unit configured to control monitoring of a radar wave in the frequency band based on the result of the discovery before use of the frequency band by a base station of a cellular system starts.

(2)

The device according to (1), wherein, when a wireless LAN access point that uses the frequency band is discovered, the control unit controls the monitoring in a manner that the monitoring is not performed before use of the frequency band by the base station starts.

(3)

The device according to (2), wherein, when a wireless LAN access point that uses the frequency band is discovered, the control unit does not trigger the monitoring.

(4)

The device according to (2) or (3), wherein, when a wireless LAN access point that uses the frequency band is discovered, the control unit starts use of the frequency band by the base station without the monitoring.

(5)

The device according to any one of (1) to (4), wherein, when a wireless LAN access point that uses the frequency band is not discovered, the control unit controls the monitoring in a manner that the monitoring is performed before use of the frequency band by the base station starts.

(6)

The device according to (5), wherein, when a wireless LAN access point that uses the frequency band is discovered, the control unit triggers the monitoring.

(7)

The device according to (5) or (6), wherein, when no radar waves are detected during the monitoring, the control unit starts use of the frequency band by the base station.

(8)

The device according to (4) or (7), wherein the use of the frequency band by the base station is use of the frequency band according to carrier sense multiple access/collision avoidance (CSMA/CA).

(9)

The device according to (4), (7), or (8), wherein the use of the frequency band by the base station is use of the frequency band as a secondary component carrier of carrier aggregation.

(10)

The device according to any one of (1) to (9), wherein the monitoring is monitoring for a predetermined period.

(11)

The device according to (10), wherein the monitoring is channel availability check of dynamic frequency selection (DFS).

(12)

The device according to any one of (1) to (11), further including a discovery unit configured to discover a wireless LAN access point that uses the frequency band.

(13)

The device according to (12), wherein the discovery unit detects a frame transmitted by a wireless LAN access point and thus discovers a wireless LAN access point that uses the frequency band.

(14)

The device according to (13), wherein the frame includes a beacon frame transmitted by a wireless LAN access point.

(15)

The device according to (13) or (14), wherein the frame includes a probe response frame transmitted by a wireless LAN access point.

(16)

The device according to any one of (1) to (15), wherein the discovered wireless LAN access point is an access point that is positioned in the vicinity of the base station (17)

The device according to any one of (1) to (16), wherein the frequency band is a wireless LAN channel.

(18)

The device according to (17), wherein the channel is a channel for which DFS is requested.

(19)

The device according to any one of (1) to (18), wherein the device is the base station, a base station device for the base station or a module for the base station device.

(20)

A method including:

acquiring a result of discovery of a wireless LAN access point that uses a frequency band; and controlling, by a processor, monitoring of a radar wave in the frequency band based on the result of the discovery before use of the frequency band by a base station of a cellular system starts.

(21)

A program for causing a processor to execute:

acquiring a result of discovery of a wireless LAN access point that uses a frequency band; and controlling monitoring of a radar wave in the frequency band based on the result of the discovery before use of the frequency band by a base station of a cellular system starts.

(22) A readable storage medium having a program stored therein, the program causing a processor to execute:
acquiring a result of discovery of a wireless LAN access point that uses a frequency band; and
controlling monitoring of a radar wave in the frequency band based on the result of the discovery before use of the frequency band by a base station of a cellular system starts.

REFERENCE SIGNS LIST 1 cellular system
11 cell
20 core network
30 radar station
31 area
40 terminal device
50 wireless LAN access point
51 communication area
100 base station
151 discovery unit
153 information acquisition unit
155 communication control unit
157 monitoring unit

The invention claimed is:

1. A device comprising:
circuitry configured to
acquire a result of discovery of a wireless local area network (LAN) access point that uses a frequency band,
determine whether the wireless LAN access point that uses the frequency band is discovered,
in response to determining that the wireless LAN access point that uses the frequency band is not discovered, control monitoring of a radar wave in the frequency band before use of the frequency band by a base station of a cellular system starts, the use of the frequency band by the base station being use of the frequency band as a secondary component carrier of carrier aggregation, and
in response to determining that the wireless LAN access point that uses the frequency band is discovered, control the monitoring in a manner that the monitoring is not performed before the base station starts use of the frequency band.

2. The device according to claim 1,
wherein, in response to discovering a wireless LAN access point that uses the frequency band, the circuitry is further configured to not trigger the monitoring.

3. The device according to claim 1,
wherein, in response to discovering a wireless LAN access point that uses the frequency band, the circuitry is further configured to start use of the frequency band by the base station without the monitoring.

4. The device according to claim 1,
wherein, in response to not discovering a wireless LAN access point that uses the frequency band, the circuitry is further configured to control the monitoring in a manner that the monitoring is performed before use of the frequency band by the base station starts.

5. The device according to claim 4,
wherein, in response to discovering a wireless LAN access point that uses the frequency band, the circuitry is further configured to trigger the monitoring.

6. The device according to claim 4,
wherein, in response to not detecting radar waves during the monitoring, the circuitry is further configured to start use of the frequency band by the base station.

7. The device according to claim 3,
wherein the use of the frequency band by the base station is use of the frequency band according to carrier sense multiple access/collision avoidance (CSMA/CA).

8. The device according to claim 1,
wherein the monitoring is monitoring for a predetermined period.

9. The device according to claim 8,
wherein the monitoring is channel availability check of dynamic frequency selection (DFS).

10. The device according to claim 1, wherein the circuitry is further configured to discover a wireless LAN access point that uses the frequency band.

11. The device according to claim 10,
wherein the circuitry is further configured to detect a frame transmitted by a wireless LAN access point, and discover a wireless LAN access point that uses the frequency band.

12. The device according to claim 11,
wherein the frame includes a beacon frame transmitted by a wireless LAN access point.

13. The device according to claim 11,
wherein the frame includes a probe response frame transmitted by a wireless LAN access point.

14. The device according to claim 1,
wherein the discovered wireless LAN access point is an access point that is positioned in the vicinity of the base station.

15. The device according to claim 1,
wherein the frequency band is a wireless LAN channel.

16. The device according to claim 15,
wherein the channel is a channel for which DFS is requested.

17. The device according to claim 1,
wherein the device is the base station, a base station device for the base station or a module for the base station device.

18. A method comprising:
acquiring a result of discovery of a wireless LAN access point that uses a frequency band;
determining whether the wireless LAN access point that uses the frequency band is discovered;
in response to determining that the wireless LAN access point that uses the frequency band is not discovered, controlling, by a processor, monitoring of a radar wave in the frequency band before use of the frequency band by a base station of a cellular system starts, the use of the frequency band by the base station being use of the frequency band as a secondary component carrier of carrier aggregation; and
in response to determining that the wireless LAN access point that uses the frequency band is discovered, controlling, by the processor, the monitoring in a manner that the monitoring is not performed before use of the frequency band by the base station starts.

19. A device comprising:
circuitry configured to
acquire a result of discovery of a wireless local area network (LAN) communication that uses a frequency band,
determine whether the wireless LAN communication that uses the frequency band is discovered, in response to determining that the wireless LAN communication that uses the frequency band is not discovered, control monitoring of a radar wave in the frequency band before use of the frequency band by the device starts, the use of the frequency band by the device being use of the frequency band as a secondary component carrier of carrier aggregation, and in response to determining that the wireless LAN communication that uses the frequency band is discovered, control the monitoring in a manner that the monitoring is not performed before the device starts use of the frequency band.

\* \* \* \* \*